United States Patent
Chmielewski et al.

(10) Patent No.: US 9,436,380 B2
(45) Date of Patent: Sep. 6, 2016

(54) RADIAL MENUS WITH VARIABLE SELECTABLE ITEM AREAS

(75) Inventors: Paul R. Chmielewski, Byron, MN (US); Brian J. Cragun, Rochester, MN (US); Michael J. Fork, Gibsonburg, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 685 days.

(21) Appl. No.: 12/468,404

(22) Filed: May 19, 2009

(65) Prior Publication Data
US 2010/0299637 A1   Nov. 25, 2010

(51) Int. Cl.
| G06F 3/0488 | (2013.01) |
| G06F 3/0482 | (2013.01) |
| G06F 3/01 | (2006.01) |
| G06F 3/048 | (2013.01) |
| G06F 3/0484 | (2013.01) |

(52) U.S. Cl.
CPC ......... G06F 3/04883 (2013.01); G06F 3/0482 (2013.01); G06F 3/017 (2013.01); G06F 3/048 (2013.01); G06F 3/04847 (2013.01)

(58) Field of Classification Search
CPC .... G06F 3/017; G06F 3/048; G06F 3/04847; G06F 3/04883; G06F 3/04882
USPC ......................................... 715/765, 834, 854
See application file for complete search history.

(56) References Cited

U.S. PATENT DOCUMENTS

| 5,828,360 A |  | 10/1998 | Anderson et al. |  |
| 6,094,197 A | * | 7/2000 | Buxton | G06F 3/0482 341/22 |
| 2004/0095395 A1 |  | 5/2004 | Kurtenbach |  |
| 2006/0055662 A1 |  | 3/2006 | Rimas-Ribikauskas et al. |  |
| 2006/0117067 A1 | * | 6/2006 | Wright | G06F 17/30017 |
| 2007/0180392 A1 | * | 8/2007 | Russo | G06F 3/0482 715/765 |
| 2007/0234224 A1 |  | 10/2007 | Leavitt et al. |  |
| 2008/0059913 A1 | * | 3/2008 | Burtner | G06F 3/0482 715/854 |
| 2008/0229245 A1 |  | 9/2008 | Ulerich et al. |  |

FOREIGN PATENT DOCUMENTS

| EP | 0550374 A2 | 7/1993 |
| JP | 09081320 A | 3/1997 |
| JP | 2002297283 A | 10/2002 |
| TW | 200821904 A | 5/2008 |
| TW | M356335 U | 5/2009 |
| WO | 0079375 A1 | 12/2000 |
| WO | 2004092906 A2 | 10/2004 |

OTHER PUBLICATIONS

Fitzmaurice, et al, "PieCursor: Merging Pointing and Command Selection for Rapid In-place Tool Switching", XP-002593794, Apr. 2008, pp. 1361-1370.

* cited by examiner

*Primary Examiner* — Sherrod Keaton
(74) *Attorney, Agent, or Firm* — Patterson + Sheridan, LLP

(57) ABSTRACT

A method and apparatus for facilitating selection of items from a radial menu. Radial menu items may be differentiated from one another based on a desired difficulty of selection from the radial menu. Where it is desirable to make a radial menu item easy to select, the radial menu item may be placed in a relatively larger pie slice of the radial menu. Conversely, where it is desirable to make a radial menu item difficult to select, the radial menu item may be placed in a relatively smaller pie slice of the radial menu.

15 Claims, 20 Drawing Sheets

RADIAL MENUS WITH VARIABLE SELECTABLE ITEM AREAS

BACKGROUND OF THE INVENTION

1. Field of the Invention

The present invention is generally related to graphical user interfaces (GUIs), and more specifically to selecting items from a radial menu.

2. Description of the Related Art

Most modern computers include applications that allow a user to interact with the application while performing operations associated with the application. For example, an application may be configured to receive commands from the user to display data, modify data, initiate a particular task, and the like. In the past, user interaction with applications was facilitated by a command line interface. The command line interface allowed users to type predefined commands to interact with an application. However, command line interfaces require users to memorize large lists of commands to communicate with each application.

More recently, user interaction with applications has involved the use of graphical user interfaces, or GUIs. For example, most applications today are configured to display a window including a menu bar on a display screen. The menu bar may include one or more pull down menus including lists of functions and commands that may be used to interact with the application.

SUMMARY OF THE INVENTION

The present invention is generally related to graphical user interfaces (GUIs), and more specifically to selecting items from a radial menu.

One embodiment of the invention provides a computer implemented method for displaying a radial menu, comprising configuring one or more processors to perform an operation. The operation generally comprises displaying, on a screen of an output device, a radial menu comprising a plurality of pie slices, each pie slice defining a selection zone for a respective radial menu item, wherein a first pie slice of the plurality of pie slices has a first predefined size. The operation further comprises receiving a first gesture that moves a screen pointer over the first pie slice on the screen, thereby activating the first pie slice of the radial menu. In response to the activation of the first pie slice, the operation further comprises executing a menu manager on one or more of the processors to change a size of the first pie slice from the first predefined size to a second predefined size.

Another embodiment of the invention provides a computer readable storage medium comprising a program product which, when executed, is configured to perform an operation for displaying a radial menu. The operation generally comprises displaying, on a screen of an output device, a radial menu comprising a plurality of pie slices, each pie slice defining a selection zone for a respective radial menu item, wherein a first pie slice of the plurality of pie slices has a first predefined size. The operation further comprises receiving a first gesture that moves a screen pointer over the first pie slice on the screen, thereby activating the first pie slice of the radial menu. In response to the activation of the first pie slice, the operation further comprises executing a menu manager on one or more of the processors to change a size of the first pie slice from the first predefined size to a second predefined size.

Yet another embodiment of the invention provides a system generally comprising a memory comprising a program and a processor. The processor, when executing the program, is configured to: display, on a screen of an output device, a radial menu comprising a plurality of pie slices, each pie slice defining a selection zone for a respective radial menu item, wherein a first pie slice of the plurality of pie slices has a first predefined size. The processor is further configured to receive a first gesture that moves a screen pointer over the first pie slice on the screen, thereby activating the first pie slice of the radial menu. In response to the activation of the first pie slice, the processor is configured to change a size of the first pie slice from the first predefined size to a second predefined size.

A further embodiment of the invention provides a computer implemented method for displaying a radial menu, comprising configuring one or more processors to perform an operation. The operation generally comprises receiving a predefined screen pointer event for displaying a radial menu on a screen of an output device, and in response to receiving the predefined screen pointer event determining a plurality of radial menu items to be displayed in the radial menu, wherein each radial menu item has an associated weight value. The method further comprises displaying, on the screen, the plurality of radial menu items in respective pie slices of the radial menu, wherein a size of each of the pie slices is determined based on the weight value of a respective radial menu item.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
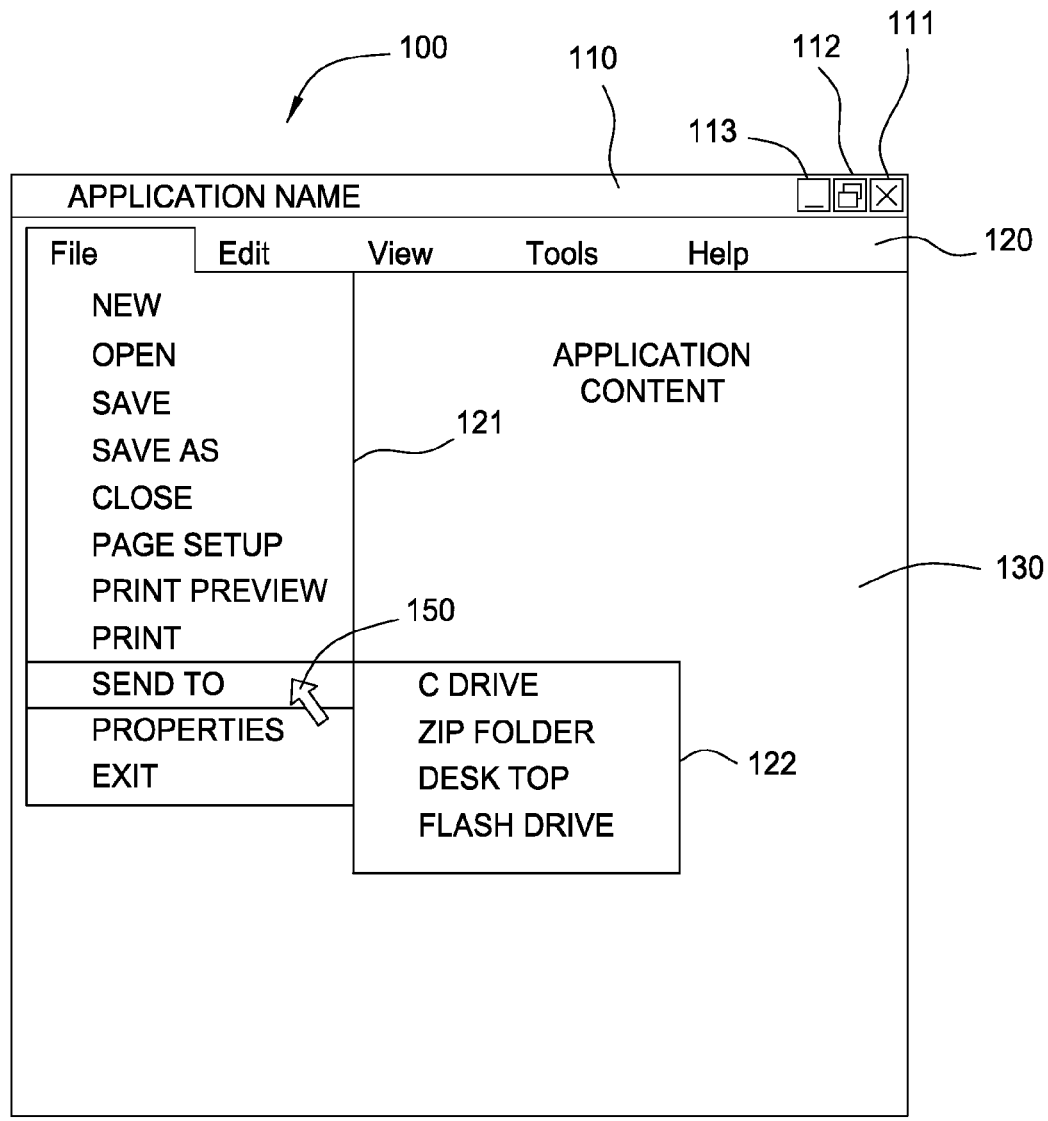
FIG. 1 illustrates a drop-down menu according to the prior art.

The present invention is generally related to graphical user interfaces (GUIs), and more specifically to selecting items from a radial menu. Radial menu items may be differentiated from one another based on a desired difficulty of selection from the radial menu. Where it is desirable to make a radial menu item easy to select, the radial menu item may be placed in a relatively larger pie slice of the radial menu. Conversely, where it is desirable to make a radial menu item difficult to select, the radial menu item may be placed in a relatively smaller pie slice of the radial menu.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates an exemplary graphical user interface (GUI) 100 according to the prior art. GUI 100 may be displayed on a display screen, such as, for example, a computer monitor to facilitate communication between a user and an application. The GUI 100 may include a menu bar 120 having a plurality of menus including, for example, the File menu, Edit menu, View menu, Tools menu, and Help menu, as illustrated in FIG. 1. A particular menu may be selected from the menu bar, for example, by clicking on a desired menu using a mouse. Each of the menus in the menu bar 120 are drop down menus. Therefore, when a particular menu is selected, a list of items in the menu is displayed.

A particular item may be selected from a drop down menu by moving the mouse pointer vertically up and down the list until the mouse pointer is above a desired item. Selecting a menu item may include performing a second mouse click to select the desired item. For example, a first mouse click on a desired menu may display menu items in a drop down list. A user may then move a mouse pointer vertically up and/or down until the mouse pointer is over a desired menu item. Once the mouse pointer is above the desired menu item, a second click of the mouse may result in the selection of the menu item.

In some cases, a menu item may be a sub-menu. For example, the Send To item of the File Menu may be a sub-menu. Accordingly, as illustrated in FIG. 1, moving the mouse pointer over the Send To item may result is a cascaded sub-menu 122 to be displayed. Each cascaded sub-menu may have its own cascaded sub menu, which may result in several cascaded sub-menus being displayed before the desired item is selected.

However, menu bars and drop down menus are not efficient at allowing a user to quickly select a desired item. First, selecting a menu item requires at least two mouse clicks as described above. Second, in drop down menus having a large number of items, the menu items may be closely spaced, which may require the user to scan up and down along the menu several times before a desired item is found. Furthermore, drop down menus with a large number of closely spaced items have an increased probability of erroneous selection of menu items.

The inefficiency of drop down menus may adversely affect users of applications where a fast response time is desired from the user while interacting with the applications. For example, in a gaming application a user's response time in responding to a particular circumstance in the game may be critical to the user's performance in the game. As an example, in a game where performance is determined by the user's ability to defeat opponents in a fight, the ability of the user to detect and quickly attack opponents may be crucial to performing successfully completing the game.

Embodiments of the invention provide radial menus that allow users to quickly make selections of menu items using a set of predefined gestures. The predefined gestures may include simple and/or complex gestures. The terms "simple" and "complex" as used herein are not meant to be limiting on the invention. Rather, the terms "simple" and "complex" are used to illustrate that a wide range of different gestures may be used to facilitate interaction between a user and a radial menu.

In one embodiment, a radial menu may be displayed on a display screen in response to detecting a predefined screen pointer event such as a mouse click. Other screen pointer events may include touching the display screen with a finger or stylus pen, pressing one or more keys on a keyboard, receiving a voice command, and the like. Thereafter, a complex gesture may be made using the screen pointer to select the active radial menu item.

Exemplary System

Figure 2:
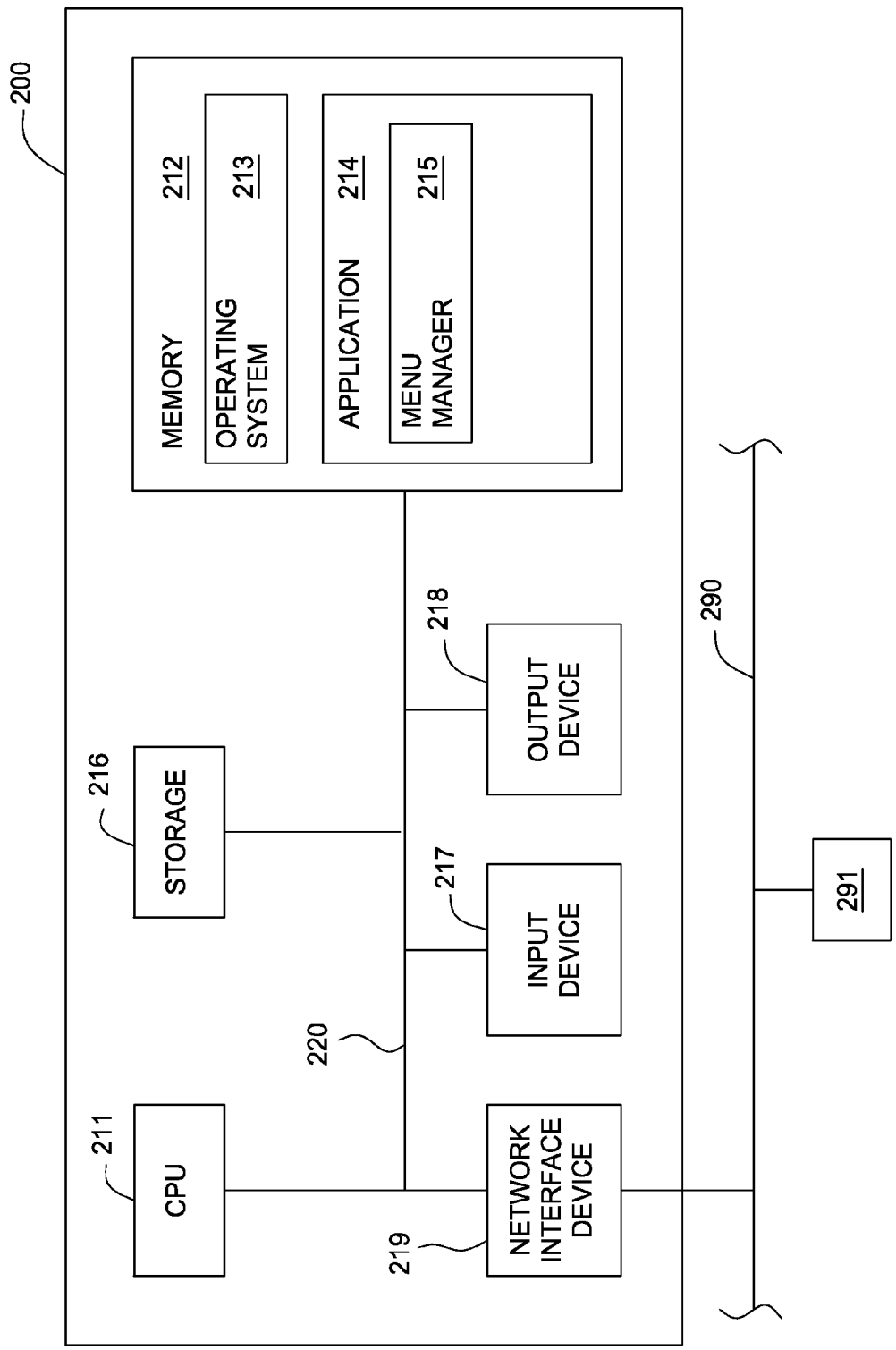
FIG. 2 illustrates an exemplary system according to an embodiment of the invention.

FIG. 2 depicts a block diagram of a system 200 in which embodiments of the invention may be implemented. The system 200 may include a Central Processing Unit (CPU) 211 connected via a bus 220 to a memory 212, storage 216, an input device 217, an output device 218, and a network interface device 219. The input device 217 can be any device to give input to the system 200. For example, a keyboard, keypad, light-pen, touch-screen, track-ball, or speech recognition unit, audio/video player, and the like could be used. The output device 218 can be any device to give output to the user, e.g., any conventional display screen. Although shown separately from the input device 217, the output device 218 and input device 217 could be combined. For example, a display screen with an integrated touch-screen, a display with an integrated keyboard, or a speech recognition unit combined with a text speech converter could be used.

The network interface device 219 may be any entry/exit device configured to allow network communications between the system 200 and one or more other devices 291 via a network 290. For example, the network interface device 119 may be a network adapter or other network interface card (NIC).

Storage 216 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 212 and storage 216 could be part of one virtual address space spanning multiple primary and secondary storage devices.

The memory 212 is preferably a random access memory sufficiently large to hold the necessary programming and data structures of the invention. While memory 212 is shown as a single entity, it should be understood that memory 212 may in fact comprise a plurality of modules, and that memory 212 may exist at multiple levels, from high speed registers and caches to lower speed but larger DRAM chips.

Illustratively, the memory 212 contains an operating system 213. Illustrative operating systems, which may be used to advantage, include Linux (Linux is a trademark of Linus Torvalds in the US, other countries, or both) and Microsoft's Windows®. More generally, any operating system supporting the functions disclosed herein may be used.

Memory 212 may also include one or more applications 214. The applications 214 may be software products comprising a plurality of instructions that are resident at various times in memory and storage devices in the computer system 200. When read and executed by one or more CPU 211, the applications 214 may cause the computer system 200 to perform the steps necessary to execute steps or elements embodying the various aspects of the invention.

In one embodiment, the applications 214 may include a menu manager program 215, which may be configured to display a radial menu on the output device 218, and detect selection of one or more radial menu items, as is discussed in greater detail below. In some embodiments the application program 214 and menu manager 215 may reside on a networked computer device 291 and may be configured to manage radial menus on the output device 118 of computer system 200. The applications 214 may also include user preferences 221. The user preferences 221 may determine one or more characteristics of radial menus, for example, the displaying of radial menus, making selections from radial menus, and the like, as will be discussed in greater detail below.

Exemplary Radial Menus

Figure 3:
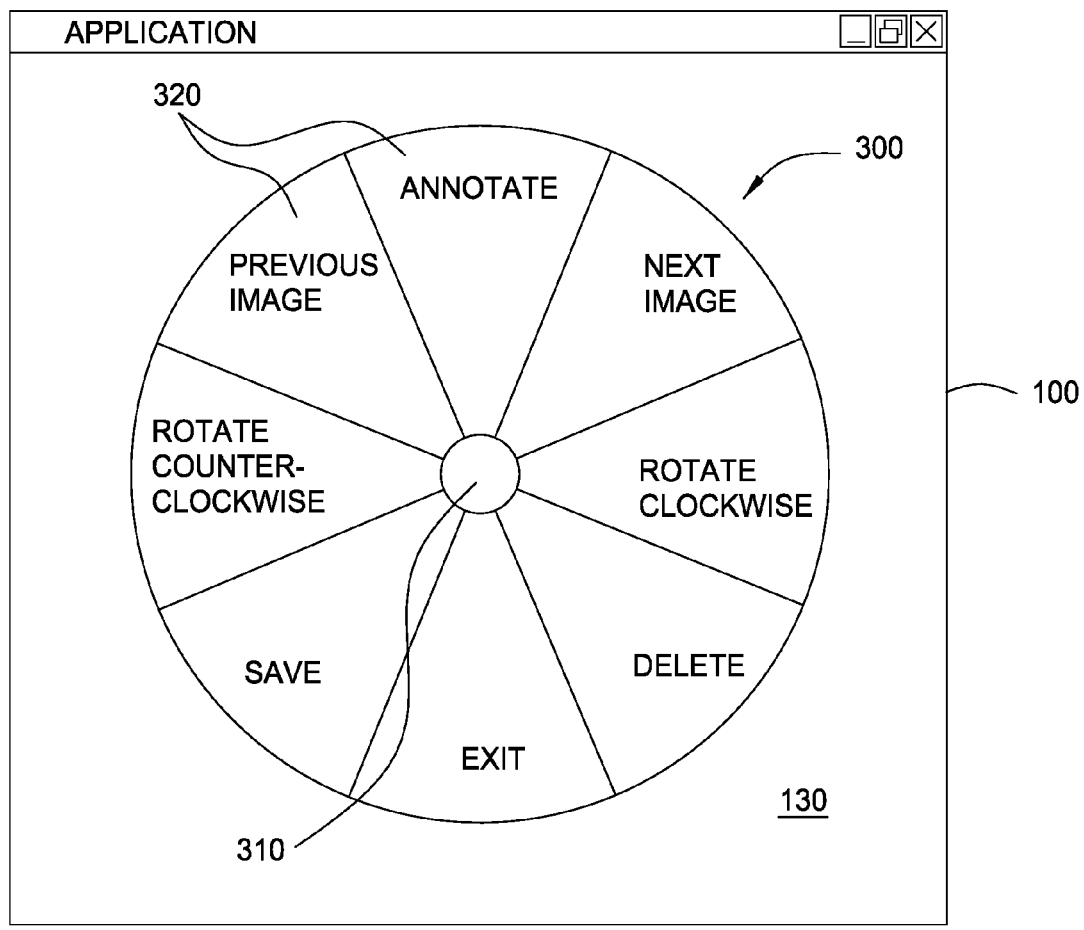
FIG. 3 illustrates an exemplary radial menu according to an embodiment of the invention.

FIG. 3 illustrates an exemplary radial menu 300, according to an embodiment of the invention. In one embodiment, the radial menu 300 may be displayed in an application window 100 by the menu manager 215, as illustrated in FIG. 3. However, in alternative embodiments, the menu manager 215 may be configured to display the radial menu 300 at any location on a screen, whether inside or outside a window.

In general, the radial menu 300 may include a center 310 and a plurality of radial menu items 320 placed radially outwards from the center 310. For purposes of illustration, the radial menu 300 is assumed to be associated with an image editing software. Accordingly, the radial menu items 320 displayed in FIG. 3 include "Previous Image", "Next Image", "Annotate", "Rotate Clockwise", "Rotate Counterclockwise", "Save", "Exit", and "Delete". In a particular embodiment, the radial menu 300 may include between 6 and 8 radial menu items, however, any reasonable number of radial menu items may be included in the radial menu 300 in other embodiments.

The radial menu items 320 may be selected by using a screen pointer such as, for example, a mouse pointer, a stylus pen, trackball pointer, and the like, as is described in greater detail below. Each of the radial menu items 320 may be associated with commands and/or functions that may be used to communicate with an application 114 associated with the radial menu 300. For example, the "Next Image" radial menu item, when selected, may cause a new image to be displayed in an application content area 130 of window 100 in FIG. 3. As another example, the "Annotate" radial menu item, when selected, may launch a function that may allow a user to insert annotations for an image displayed in the application content area 130. In some embodiments, selecting a radial menu item may result in a second or cascaded radial menu to be displayed.

Figure 4A:
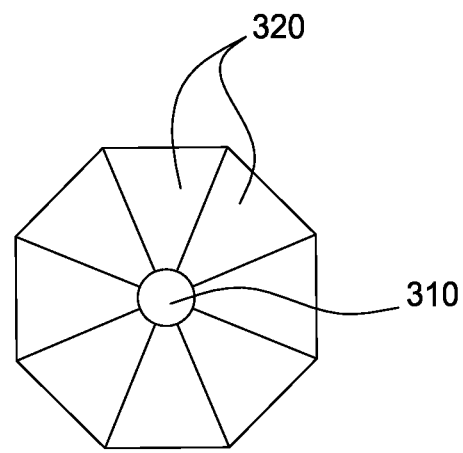
FIGS. 4A-4C illustrate further exemplary radial menus according to embodiments of the invention.
Figure 4B:
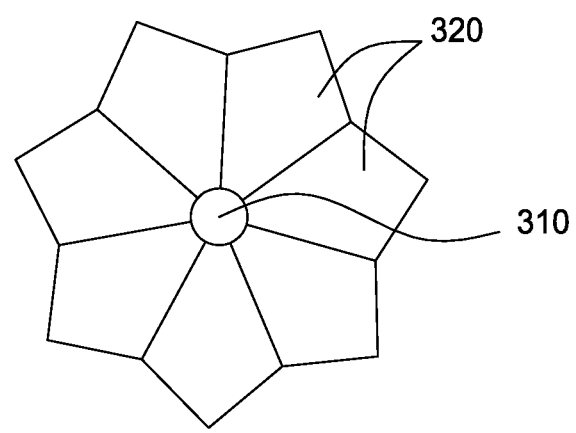
Figure 4C:
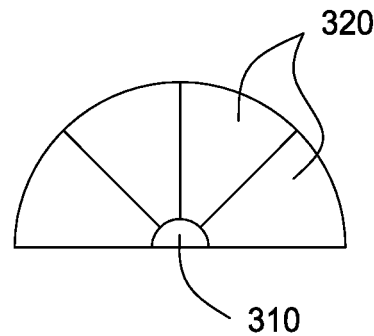

In one embodiment of the invention, the radial menu items 320 may be displayed as a "pie slices" 320, as illustrated in FIG. 3. However, in alternative embodiments, the radial menu items may have any reasonable shape that allows a plurality of radial menu items 320 to be displayed radially outwards from the center 310. FIGS. 4A and 4B, illustrate some alternative shapes for the radial menu items 320. Furthermore, while a circular radial menu 300 is illustrated in FIG. 3, in alternative embodiments, the radial menu 300 may be semicircular, quadra circular, or any other radial shape. For example, FIG. 4C illustrates a semicircular radial menu, according to an embodiment of the invention.

The radial menu 300 may be a pop-up menu that is displayed upon the occurrence of a predefined screen pointer event. For example, in one embodiment, the menu manager 215 may be configured to display the radial menu 300 on a screen (for example, in window 100) upon detecting a mouse click. In a particular embodiment, the radial menu 300 may be displayed when a right button of a mouse is clicked. While using mouse clicks to display radial menus is described herein, alternative screen pointer events that may cause a radial menu to appear may include, for example, touching a screen with a stylus pen or finger, pressing one or more keys on a keyboard, receiving a voice command, and the like.

Figure 5:
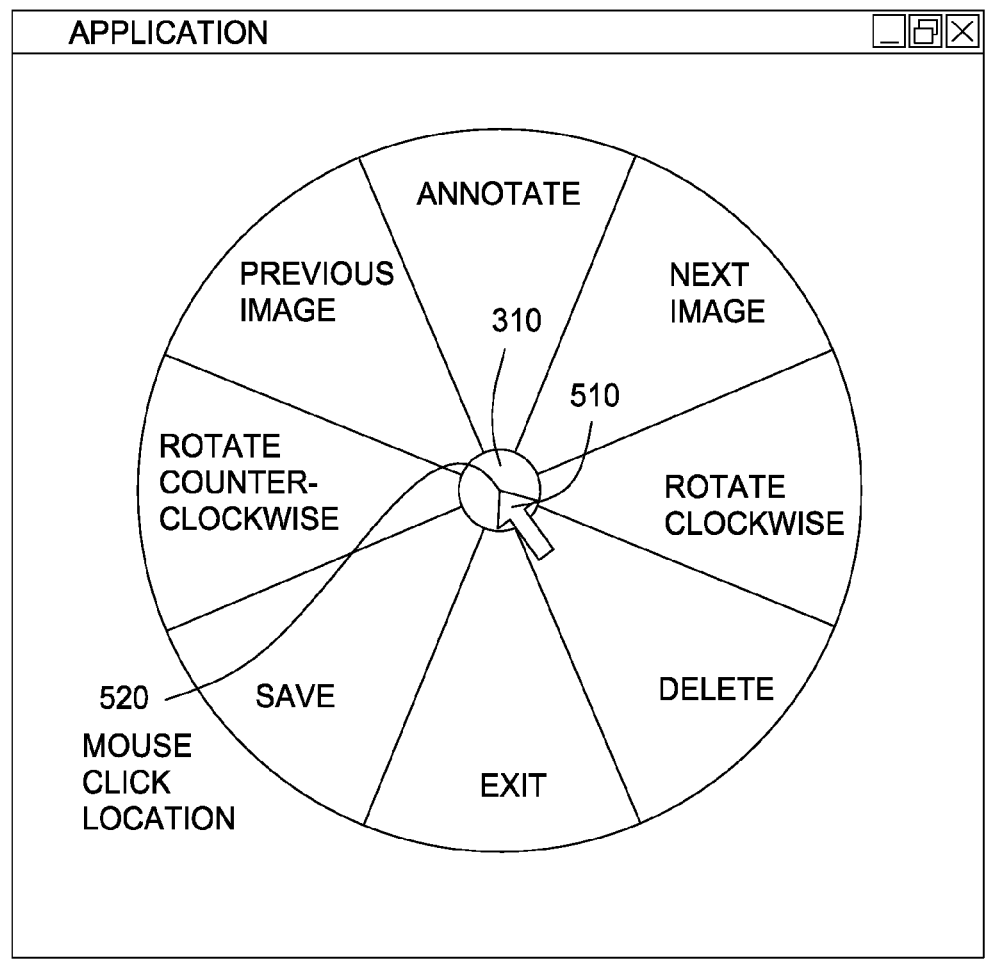
FIG. 5 illustrates an exemplary screen pointer event for displaying a radial menu, according to an embodiment of the invention.

In one embodiment of the invention, the menu manager 215 may display the radial menu such that the center of the radial menu aligns with the screen pointer. FIG. 5 illustrates a radial menu 300 displayed such that the center 310 of the radial menu 300 aligns with a location 520 of a screen pointer 510. As illustrated in FIG. 5, the screen pointer may be a mouse pointer and the location 520 may be a location of the mouse pointer when the mouse is clicked. Alternatively the location 520 may be the location where a stylus pen or finger touches a display screen.

Selection of a radial menu item from a radial menu may involve moving the screen pointer 510 in the direction of a desired radial menu item 320. For example, to select the "Annotate" radial menu item, the screen pointer may be moved straight up (in a generally 90 degrees direction) towards the pie slice of the "Annotate" radial menu item. The moving of the screen pointer on the display screen is generally referred to hereinafter as a "stroke" or a gesture (the terms gesture and stroke are used interchangeably herein). In the case of a mouse pointer, strokes may be performed by simply moving the mouse on a mouse pad. While using a stylus pen or finger on a touch screen, the finger or stylus pen may simply be dragged across the screen to perform a stroke.

The gestures used for selecting radial menu items may be selected from a predefined set of gestures. The predefined set of gestures may include any combination of simple and/or complex predefined gestures. In other words, a wide range of different gestures may be defined to facilitate interaction between a user and the radial menu. As an example, simple gestures may include movement of a screen pointer in a single direction. Complex gestures may include movement of a screen pointer in multiple directions. In one embodiment, performing the gestures may also include other screen pointer events such as, for example, button click downs, button release, and the like. For example, in some embodiments, the gestures may be performed while a mouse button is clicked down. Alternatively, in other embodiments, the gestures may be performed before, after, or in between one or more screen pointer events such as, for example, in between mouse button click down and releases.

In one embodiment, placing the screen pointer over a radial menu item 320 may cause the radial menu item to become active. When a radial menu item 320 is active, the occurrence of a selection event, such as, for example, a mouse click, may cause the radial menu item 320 to be selected. In one embodiment of the invention, the menu manager 215 may be configured to provide a visual indication to identify an active radial menu item.

Figure 6:
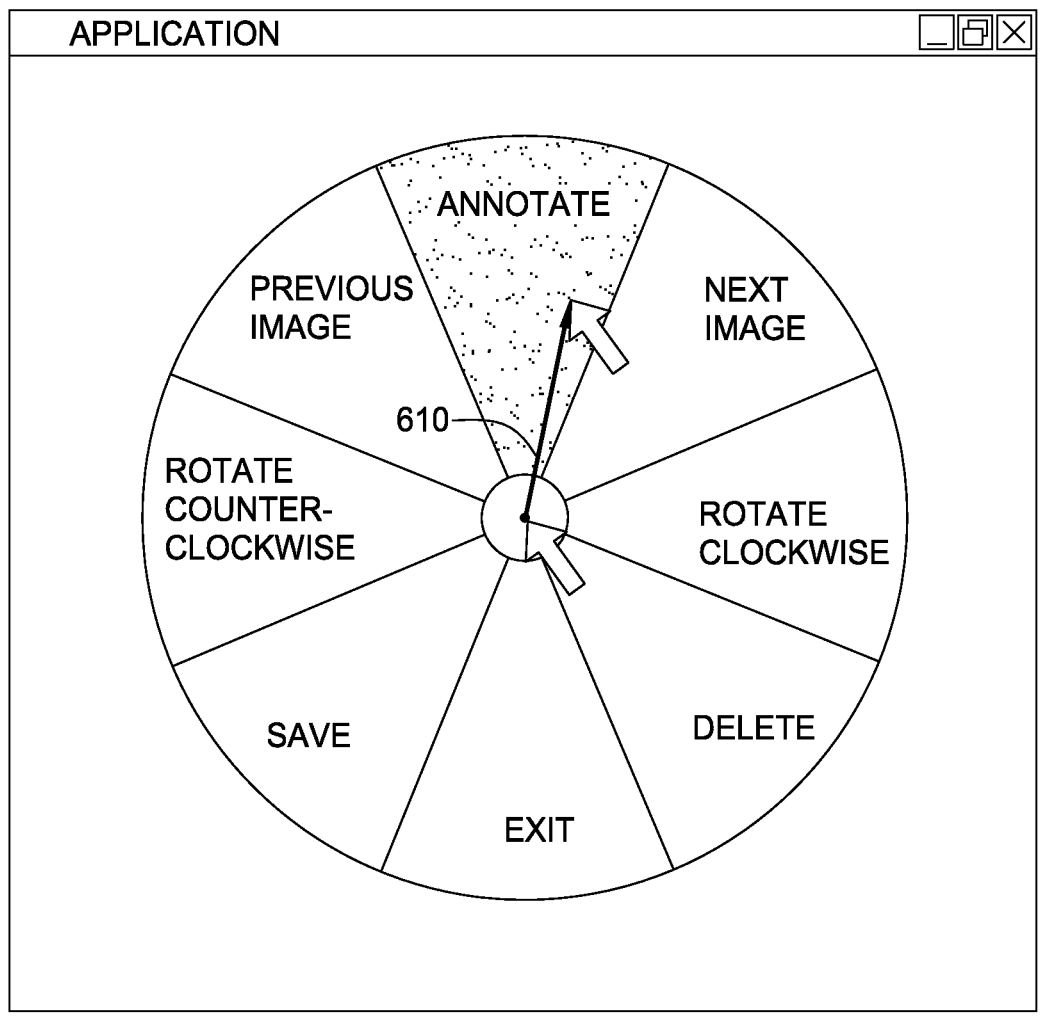
FIG. 6 illustrates an exemplary stroke according to an embodiment of the invention.

FIG. 6 illustrates an exemplary stroke 610 which results in the activation of a radial menu item, according to an embodiment of the invention. As illustrated in FIG. 6, the stroke 610 moves the screen pointer over the "Annotate" radial menu item. As a result, the menu manager 215 may change the background color of the "Annotate" pie slice, which is indicated by the shading of the "Annotate" pie slice in FIG. 6. The change in color may identify the "Annotate" radial menu item as the active item. Other methods for providing a visual indication such as, for example, bold facing the letters of the active radial menu item, dimming or fading the pie slices or letters of non-active radial menu items, and the like, are also contemplated. While a straight line stroke is illustrated in FIG. 6, the stroke 610 may include any movement in any and/or multiple directions on a display screen in alternative embodiments.

In one embodiment, the center 310 of the radial menu 300 may be an inactive center. In other words, no radial menu items 320 may be active while the screen pointer 510 lies over the center portion 310. Therefore, when the menu manager 215 aligns the center 310 of the radial menu when the radial menu is displayed as described above, no radial menu items 320 may be initially active. Thereafter, user strokes may cause one or more radial menu items to become active. If the user strokes return the screen pointer to the center 310, all radial menu items may again become inactive.

One embodiment of the invention may allow radial menu items 320 to be selected using multiple gestures. In some embodiments, the gestures may include one or more screen pointer events such as, for example, mouse click downs (pressing a mouse button), mouse click offs (releasing the mouse button), touching a screen with a stylus pen or finger, removing stylus pen or finger from the screen and the like. The menu manager 215 may be configured to analyze gestures performed on a display screen to determine whether a radial menu item is selected. In one embodiment, a plurality of predefined gestures may correspond to respective menu item selections.

For example, exemplary gestures for selecting a radial menu item may include performing a first mouse click, i.e., a mouse button click down and release. The first mouse click may display a radial menu, for example, the radial menu 300 on the display screen. Thereafter, one or more gestures may be performed to move the mouse pointer over a desired radial menu item 320. As discussed above, menu manager 215 may provide a visual indication that the desired radial menu item is active. When the mouse pointer is over the desired radial menu item, the mouse may be clicked a second time. Because the second mouse click occurred while the mouse pointer is above a radial menu item 320, the menu manager may determine that a radial menu item selection has occurred. Therefore, the menu manager 215 may cause a command or function associated with the selected radial menu item to be executed.

Figure 7A:
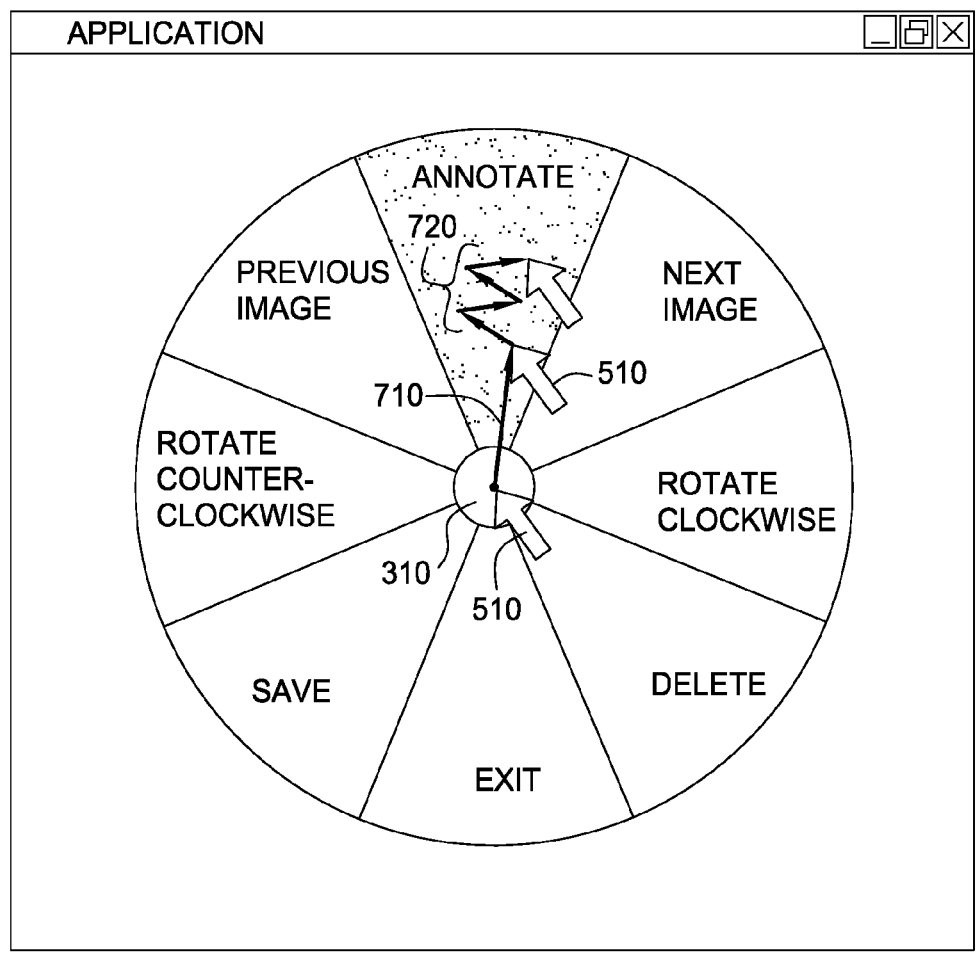
FIGS. 7A-7C illustrate exemplary strokes for selecting a radial menu item, according to an embodiment of the invention.

In one embodiment of the invention, the gestures for selecting a radial menu item may include a first mouse click (i.e., a mouse click down and release) that causes a radial menu to be displayed on the display screen, a first gesture configured to activate a radial menu item, and a predefined second gesture that is configured to select the radial menu item. FIG. 7A illustrates exemplary first and second gestures according to an embodiment of the invention. As illustrated in FIG. 7A, a first gesture 710 may move the screen pointer 510 from a center 310 of the radial menu to the "Annotate" radial menu item. Thereafter, a predefined second gesture may be performed to select the "Annotate" radial menu item. As illustrated in FIG. 7A, predefined second gesture may involve moving the screen pointer in a zigzag back and forth motion over a same path. If the predefined back and forth motion is detected by the menu manager while the screen pointer is over a radial menu item, the radial menu item may be selected.

Figure 7B:
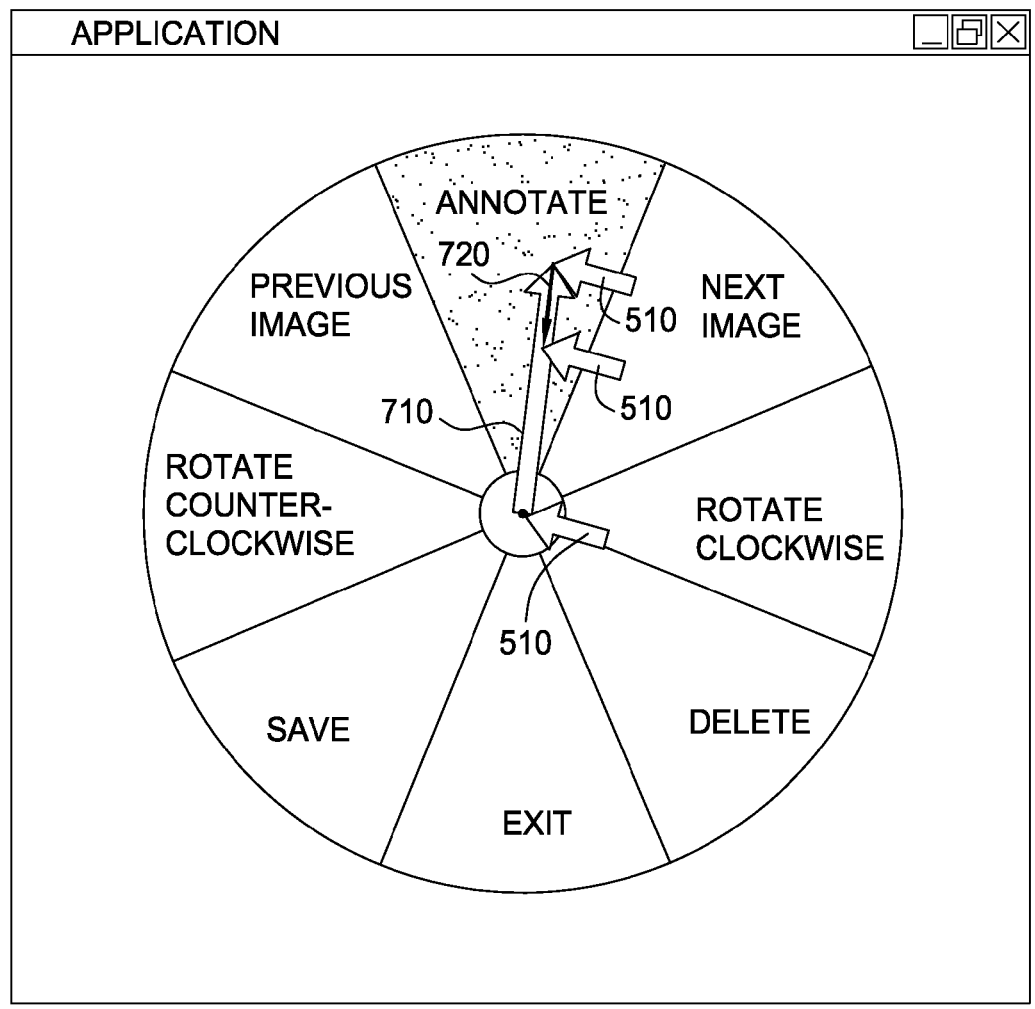

Any reasonable predefined movement of the screen pointer 510 may be used as a radial menu selection event. FIG. 7B illustrates an alternative predefined second motion that may result in the selection of a radial menu item. As illustrated in FIG. 7B, a first gesture may move the screen pointer 510 from a center 310 of the radial menu to the "Annotate" radial menu item. A predefined second gesture may move the screen pointer back in a direction towards the center 310, which may result in the selection of the "Annotate" radial menu item. Still another alternative predefined second gestures may include substantially circular and/or semi-circular movement of the screen pointer over the radial menu item.

In another embodiment, the gestures for selecting a radial menu item may involve a mouse button click down (without release), a first gesture for activating a radial menu item, and a second predefined gesture for selecting the radial menu item. The mouse button may be released after selection of the radial menu item. The mouse button click down may cause a radial menu to be displayed. The first gesture and predefined second gesture may function as described above.

In some embodiments, if a second predefined gesture is not received within a predefined period of time after activation of the radial menu, the menu manager 215 may be configured to close the radial menu. Closing the radial menu may involve removing the radial menu from the display screen. In some embodiments, the predefined period of time may begin after completion of the first gesture, e.g., after the screen pointer stops moving. For example, a screen pointer event may cause the radial menu to be displayed. Thereafter, a first gesture may be completed to activate a radial menu item. If the predefined second gesture is not received within the predefined period of time after completion of the first gesture, the radial menu may be closed by the menu manager 215.

In yet another embodiment, the menu manager 215 may select an active radial menu item if the radial menu item has been active for a predefined period of time. Accordingly, the gesture for selecting a radial menu item may involve a mouse button click down (with or without release), and a first gesture for activating a radial menu item. The mouse button click down may cause a radial menu to be displayed. The first stroke may function as described above to activate a radial menu item. The menu manager 215 may monitor the time for which a particular radial menu item has been active, and select the radial menu item after the predefined period of time.

While the first gesture is illustrated as a straight line from the center 310 of the radial menu to a desired radial menu element 320, in some embodiments, the first gesture may include movement along any part of the display screen. For example, a user may initially move the screen pointer in the direction of a first radial menu item, but then decide to choose a second radial menu item instead. Accordingly, the user may move the screen pointer across the screen until the desired second radial menu item is activated. Once the second radial menu item is activated, the user may perform the predefined second gesture to select the second radial menu item.

Figure 7C:
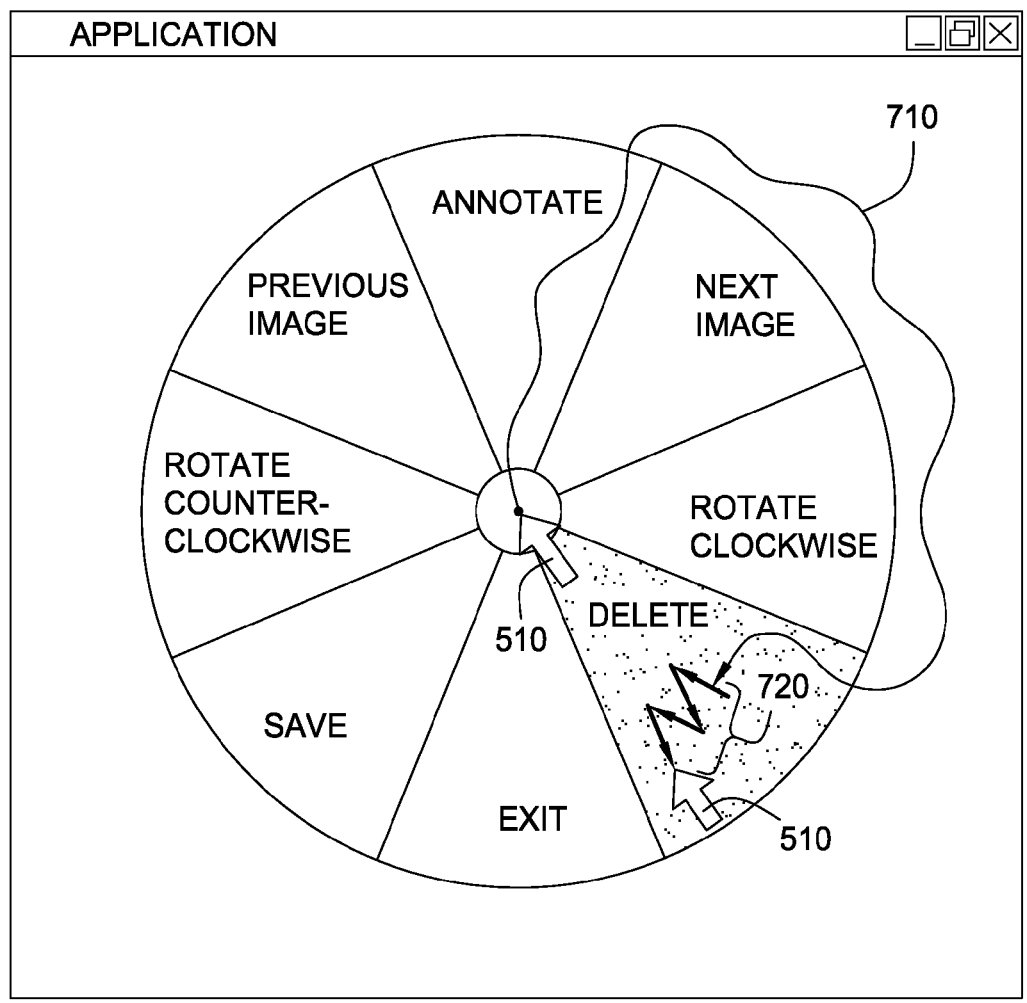

FIG. 7C illustrates exemplary first and second gestures according to another embodiment of the invention. As illustrated in FIG. 7C, the first gesture 710 may include an initial movement towards a first radial menu item ("Annotate"). The first stroke 710 may continue to move across the screen until a second radial menu item ("Delete") is activated, as indicated by the shading. Thereafter, a predefined second gesture 720 may be performed to select the second radial menu item. In some embodiments, the first gesture may include movement over multiple radial menu items until a desired radial menu item is activated.

In one embodiment of the invention, gestures for selecting a radial menu item may include a first mouse click (i.e., a mouse click down and release) that causes a radial menu to be displayed on the display screen, and a first gesture configured to activate and select the radial menu item. The first gesture may activate a menu item 320 when the mouse pointer is moved thereon. Furthermore, the menu manager 215 may be configured to analyze a speed of the screen pointer during the first stroke. If the speed exceeds (or falls below) a predefined threshold value, the activated radial menu item may be selected. The threshold speed values may be user configurable in some embodiments. For example, the threshold speed values may be defined by a user in the user preferences 221 (See FIG. 2).

In one embodiment of the invention, different gestures may be defined for interacting with different parts of the radial menu. For example, in one embodiment, a first predefined stroke may be defined for selecting radial menu items located on a first side, for example, the right side of the radial menu, and a second predefined stroke may be defined for selecting radial menu items located on a second side, for example, the left side of the radial menu. In alternative embodiment, the same stroke may result in different results in different parts of the radial menu. For example, in one embodiment, a predefined stroke performed on a first side of the radial menu may result in the activation of a radial menu item. However, performing the same predefined stroke on a second side of the radial menu may result in a radial menu item being selected.

Figure 7D:
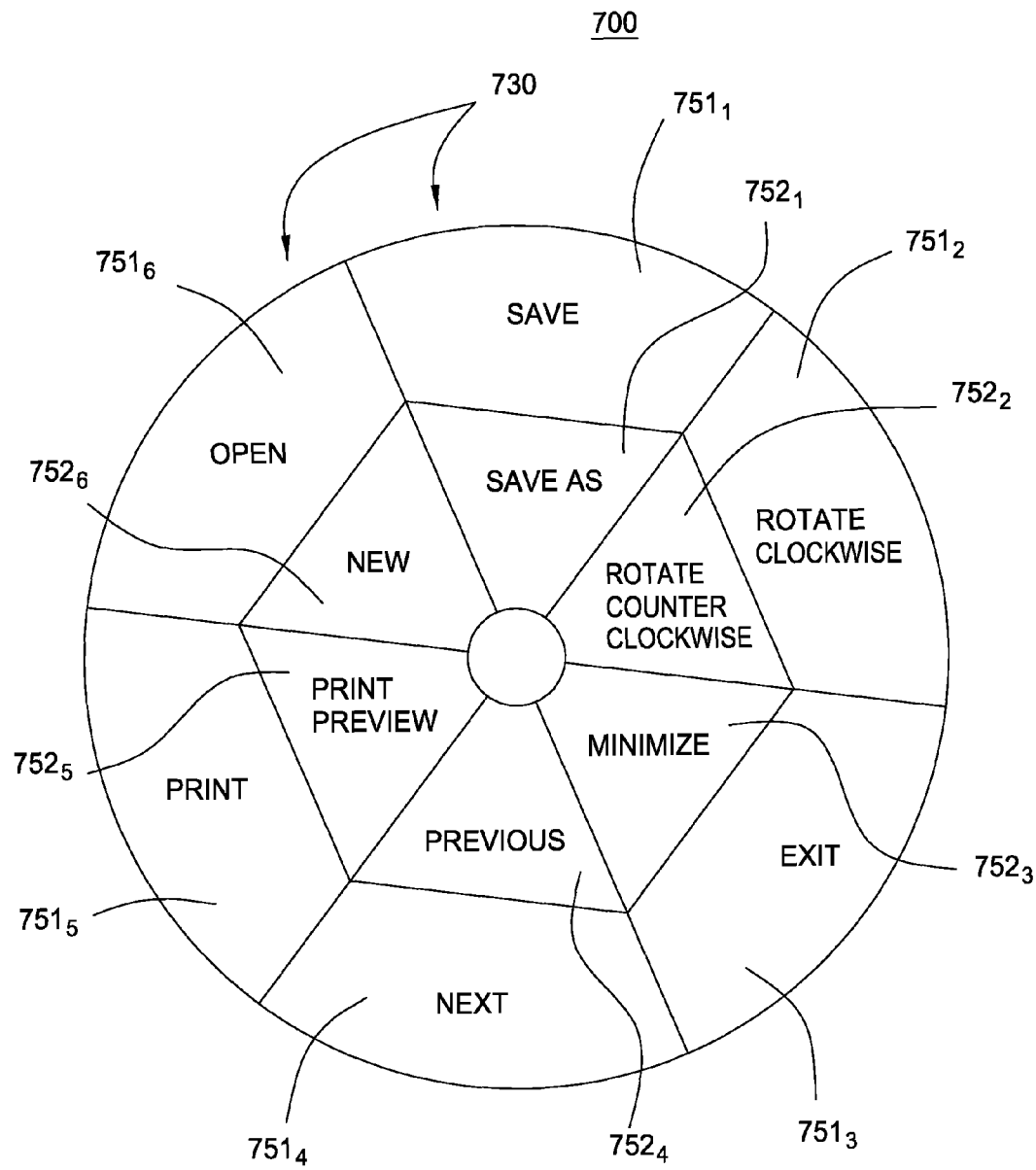
FIG. 7D illustrates an overloaded radial menu according to an embodiment of the invention.

In one embodiment of the invention, each pie slice of the radial menu may be overloaded with two or more radial menu items. FIG. 7D illustrates an exemplary radial menu 700 comprising a plurality of pie slices 730. As illustrated in FIG. 7D, each pie slice 730 may include a first radial menu item 751 and a second radial menu item 752. In one embodiment of the invention, a gesture for selecting a first radial menu item 751 may include a first mouse click (i.e., a mouse click down with or without release) that causes a radial menu to be displayed on the display screen, a first stroke configured to activate the first radial menu item 751, and a corresponding second radial menu item 752, and a predefined second stroke configured to select the first radial menu item 751. An exemplary predefined second stroke may include a stroke in a clockwise direction. A gesture for selecting a second radial menu item 751 may include a first mouse click (i.e., a mouse click down with or without release) that causes a radial menu to be displayed on the display screen, a first stroke configured to activate the second radial menu item 752 and a corresponding first radial menu item 751, and a predefined third stroke configured to select the second radial menu item 751. An exemplary predefined third stroke may include a stroke in the counter-clockwise direction.

Figure 7E:
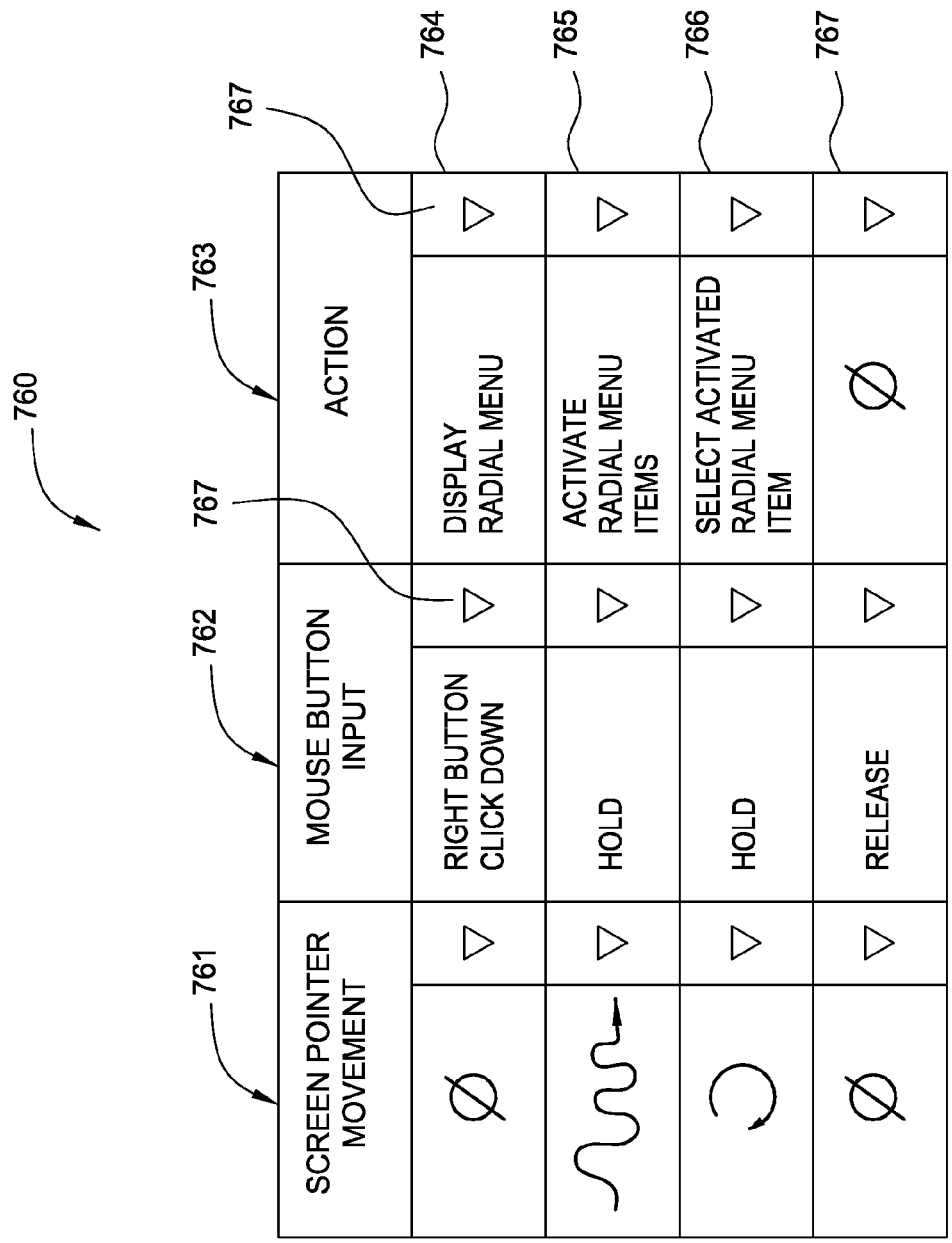
FIG. 7E illustrates an exemplary graphical user interface for defining gestures, according to an embodiment of the invention.

In one embodiment of the invention, a user may be allowed to define the particular gestures for selecting items from a radial menu. For example, in one embodiment, the application 114 may be configured to display a graphical user interface that allows a user to define a gesture for selecting radial menu items. The user defined gesture may be stored in the user preferences 221, in one embodiment. FIG. 7E illustrates an exemplary graphical user interface for defining a gesture for selecting radial menu items. As illustrated in FIG. 7E, the user preferences 221 may include a first column for defining screen pointer movement (or strokes), a second column 762 for defining mouse button input, and a third column 763 for defining an action performed based on the defined inputs in columns 761 and 762.

As illustrated in FIG. 7E, the GUI 760 may include a plurality of drop down menus 767 for defining the particular inputs and the actions performed in response to the inputs. Alternatively, the GUI may include radio buttons, text boxes, check boxes, and the like for defining the inputs and actions. In some embodiments, the GUI 760 may include a screen where the input (for example, strokes and mouse clicks) may be performed to define the inputs and/or actions.

The first row 764 defines an exemplary screen pointer event, i.e, right mouse button click down, that results in a radial menu being displayed. Alternatively, a right mouse button click down and click off may also be selected as a predefined screen pointer event for displaying a radial menu. As can be seen in row 764 of FIG. 7E, the no screen pointer movement has been defined. In alternative embodiments, the user may define a screen pointer movement for displaying the radial menu instead of (or in addition to) the right button mouse click down.

Row 765 illustrates inputs for activating radial menu items. As illustrated, radial menu items may be activated when the right mouse button is held down and the screen pointer is moved in any direction as illustrated by the symbol in row 765, column 761. Alternatively, a user may choose to select a straight line movement of the screen pointer for selecting radial menu items. Row 766 illustrates a predefined second stroke, i.e., a circular stroke, for selecting a radial menu item. Row 767 illustrates a mouse button click off. While no action is shown for the mouse button click off on FIG. 7E, in some embodiments, the mouse button click off may result in predefined action, for example, selection of the radial menu item, removing of the radial menu from the display screen, or the like.

Figure 8:
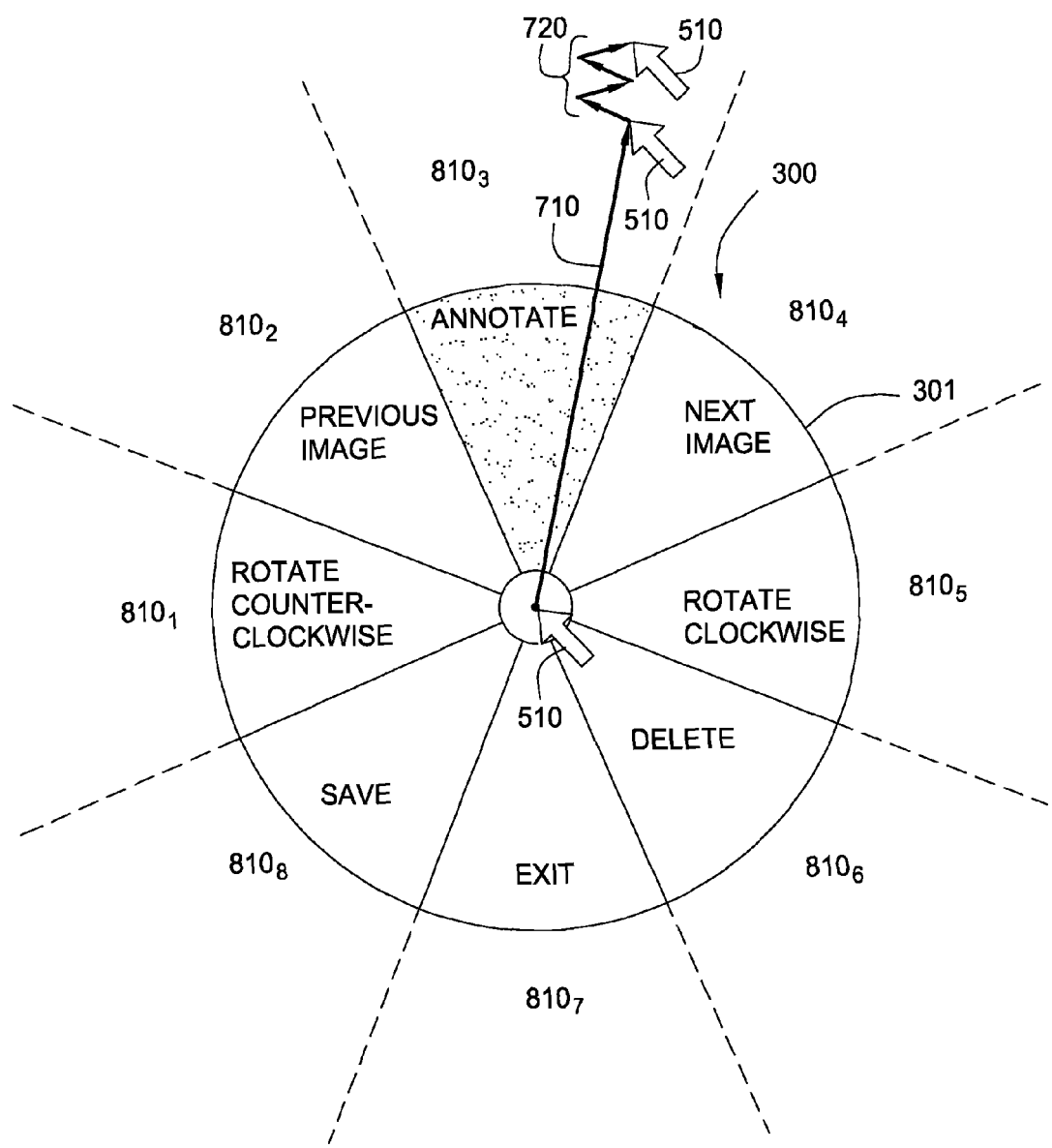
FIG. 8 illustrates an exemplary selection zone according to an embodiment of the invention.

In one embodiment of the invention, it may be possible to select radial menu items even though a selection event occurs outside the bounds of the radial menu. FIG. 8 illustrates an exemplary radial menu 300 comprising a plurality of extra-territorial zones 810$_{1-8}$ associated with respective radial menu items 320. As shown in FIG. 8, the zones 810$_{1-8}$ may be outside the visible bounds of the radial menu 300. As shown in FIG. 8, the outside bounds of the radial menu 300 are demarcated by a circle 301. The circle 301 is merely illustrative. In other embodiments, any visible geometric shape 301 is contemplated. In one embodiment of the invention, if a screen pointer is in a zone 810, the radial menu item 320 associated with the zone 810 may be active. Accordingly, if a selection event occurs in the zone 810, a selection of the radial menu item associated with the zone 810 may occur. In other words, a pie slice of the radial menu item 320 and a respective zone 810 may define a selection zone of a radial menu item within which gestures may be performed for selection of the radial menu item.

For example, FIG. 8 illustrates a first stroke 710 which moves the screen pointer 510 across the "Annotate" radial menu item pie slice and into the zone 810$_3$ associated with the "Annotate" radial menu item. As can be seen in FIG. 8, the "Annotate" radial menu item remains active even though the screen pointer is outside the bounds of the radial menu 300. Further as depicted in FIG. 8, a predefined second stroke 720 may occur in the zone 810$_3$ associated with the "Annotate" radial menu item. The menu manager 215 may detect the predefined second stroke in the zone 810$_3$ and cause the respective "Annotate" radial menu item to be selected.

Allowing users to make elongated first strokes such as, for example, the elongated first stroke 710 in FIG. 8 may reduce errors in selection of radial menu items. As can be seen in FIG. 8, the further the screen pointer is moved from the center 310 of the radial menu, the greater the area that is available for making gestures such as, for example, the predefined second gestures. By providing greater area for gestures, the probability of gesture strokes accidently moving into zones 810 of undesired radial menu items may be reduced.

Furthermore, activating radial menu items as a user performs a first stroke that is outside the bounds of the radial menu item may allow greater precision in the activation of a desired radial menu item. For example, the further the screen pointer 510 is from the center 310, the greater the radial distance that must be traveled by the screen pointer 510 to a zone 810 of an adjacent radial menu item. One skilled in the art will appreciate that allowing a user to move the screen pointer in a wider arcs around the radial menu allows increased precision in activating desired radial menu items.

Figure 9:
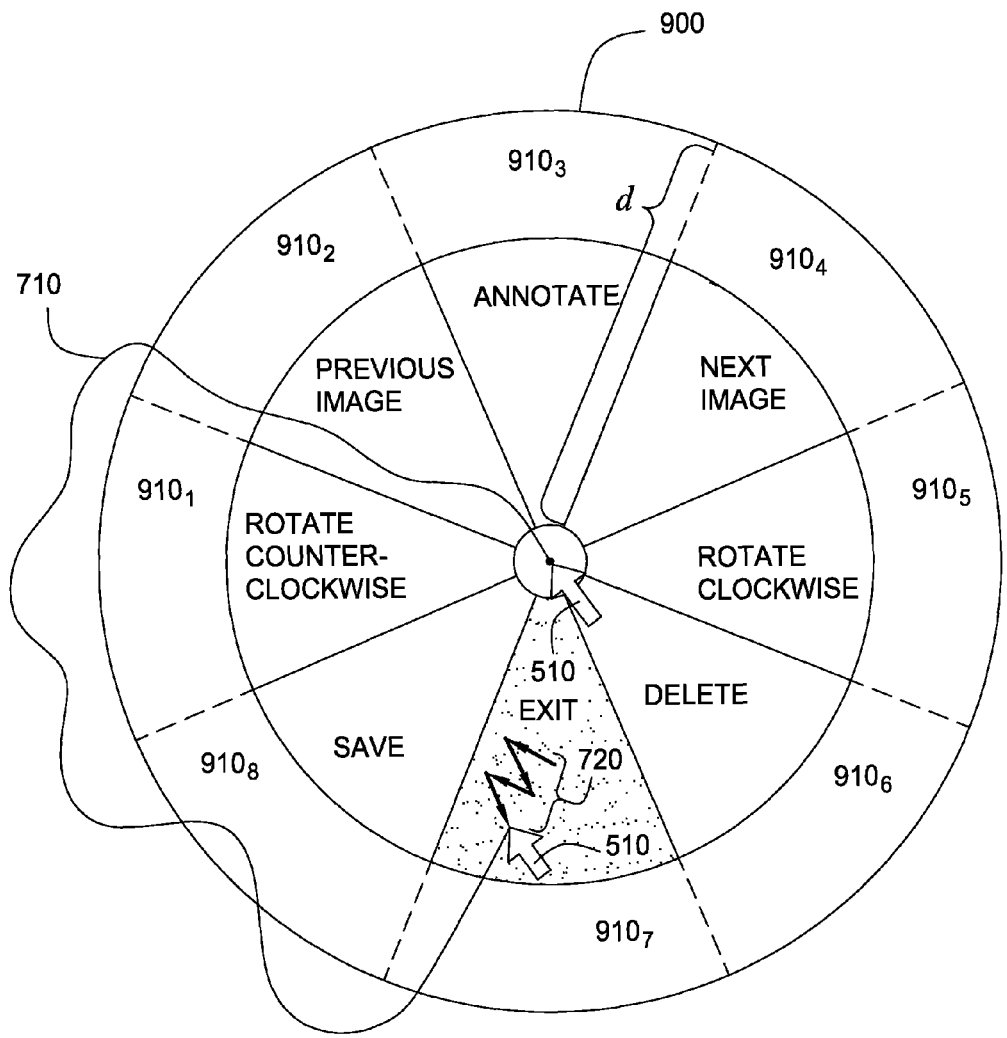
FIG. 9 illustrates another exemplary selection zone according to an embodiment of the invention.

As illustrated in FIG. 8, in some embodiments the zones 810 may extend to the edges of a display area, for example, to the edges of a display screen, an application window, or the like. In an alternative embodiment, a predefined limited selection zone may be defined outside the bounds of the radial menu for receiving selections of radial menu items. FIG. 9 illustrates a circular perimeter 900 around the radial menu 300 that defines a plurality of zones 910$_{1-8}$ for each of the radial menu items 320. In one embodiment, the perimeter may be made visible to the user, for example, by displaying a solid line, dashed line, shading the zones 910, or the like. The perimeter 900 may have a predefined distance d from the center 310 of the radial menu 300. For example, the perimeter d may be defined by a user in the user preferences 221 illustrated in FIG. 2. While a circular perimeter is shown herein, in alternative embodiments the perimeter 900 may have any reasonable shape that encompasses the radial menu 300. The dimensions of the perimeter may be user configurable in some embodiments.

In one embodiment of the invention, a predefined second stroke as described above, if performed within a zone 910, may result in the selection of a respective radial menu item 320. If a screen pointer is moved outside the perimeter 900, all radial menu items 320 may become inactive. Therefore, if the predefined second stroke is performed outside the perimeter 900, a radial menu item 320 may not be selected, thus creating a non-selective zone in the direction of a gesture if the user changes his/her mind regarding selection.

In one embodiment of the invention, selecting a radial menu item 320 may involve performing the first stroke followed by a predefined second stroke as described above. The first stroke may include moving the screen pointer in and out of the perimeter 900. An exemplary first stroke 710 is illustrated in FIG. 9. As illustrated, the first stroke 710 may begin with a movement of the mouse pointer towards a first radial menu item ("Previous Image"). As the screen pointer is moved across the pie slice representing the first radial menu item and the zone 910 associated therewith, the menu manager 215 may activate the first radial menu item. However, when the screen pointer moves outside the perimeter 900, the first radial menu item may be deactivated by the menu manager 215.

As illustrated further in FIG. 9, the first stroke may continue to move the screen pointer outside the perimeter 900 and reenter the perimeter 900 in a zone 910 associated with a second radial menu item ("Rotate Counterclockwise"). When the screen pointer enters the zone 910 associated with the second radial menu item, the menu manager 215 may activate the second menu item. However, when the screen pointer moves outside the perimeter 900 again, the second radial menu item may be deactivated by the menu manager 215.

The screen pointer may be moved in and out of the perimeter 900 several times as described above, which may result in the activation and deactivation of several radial menu items. FIG. 9, depicts the first stroke terminating in a selection zone of a third radial menu item ("Exit"), thereby activating the third radial menu item as illustrated. A predefined second stroke 720 associated with the activated menu item is also shown, which may result in the selection of the third radial menu item. In a particular embodiment, the selection may occur upon the release of a pressed mouse button.

In one embodiment of the invention, moving the screen pointer outside the perimeter 900 may result in the radial menu 300 being removed from the display screen. This may allow a user to cancel or remove the radial menu from the screen in a fluid gesture without additional actions. For example, if a user causes a radial menu to be displayed on the screen (by clicking a mouse button for example), and decides that he no longer wants to make a selection from the radial menu, the user may simply make an elongated straight line first stroke that would take the screen pointer outside the predefined perimeter 900. Upon detecting that the screen pointer is outside the perimeter 900, the menu manager 215 may remove the radial menu from the display screen.

Figure 10:
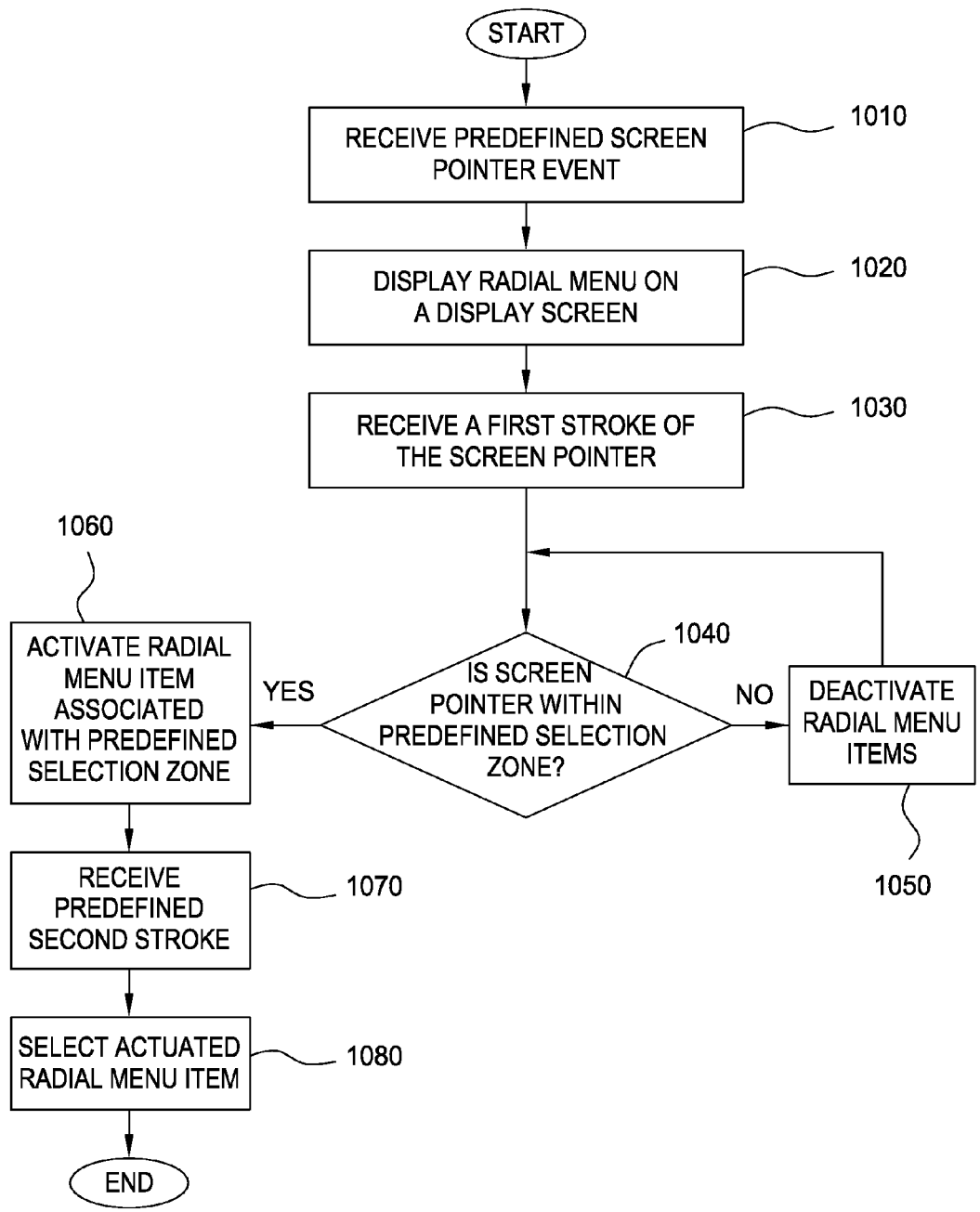
FIG. 10 is a flow diagram of exemplary operations performed by a menu manager, according to an embodiment of the invention.

FIG. 10 is a flow diagram of exemplary operations that may be performed by a menu manager 215, according to an embodiment of the invention. The operations may begin in step 1010 by receiving a predefined screen pointer event. Exemplary predefined screen pointer events may include, for example, a mouse click down, touching of a touch screen with a stylus pen or finger, and the like. In response to receiving the predefined screen pointer event the menu manager 215 may display a radial menu on a display screen, in step 1020.

In step 1030, the menu manager 215 may receive a first stroke of the screen pointer. As described above, the first stroke may include a movement of the screen pointer in any direction and/or multiple directions on the display screen. As the screen pointer moves across the screen during the first stroke, the menu manager may determine whether the screen pointer is within a predefined selection zone of one or more radial menu items of the radial menu in step 1040. The predefined selection zone may include the pie slices 320 as illustrated in FIG. 3. In some embodiments, the predefined selection zone may also include the zones 910, as described with reference to FIG. 9.

If the screen pointer is determined to be outside the predefined selection zone, all radial menu items may be deactivated in step 1050. On the other hand, if the screen pointer is within a predefined selection, zone a radial menu item associated with the predefined selection zone may be activated for selection in step 1060. In one embodiment, activating a radial menu item for selection may involve providing a visual indication that the radial menu item is active.

In step 1070, the menu manager 215 may receive a predefined second stroke, for example, the predefined second strokes 720 described with reference to FIGS. 7A and 7B. In response to receiving the predefined second stroke, the menu manager 215 may select a respective active radial menu item in step 1080. In one embodiment, selecting the radial menu item may involve launching execution of a command or function associated with the selected radial menu item.

In one embodiment of the invention, after selection of a radial menu item, the menu manager 215 may remove the radial menu from the display screen. In a particular embodiment, after selection of a particular radial menu item, the radial menu may be removed from the display screen after a predefined period of time. In some embodiments, the radial menu may fade away during the predefined period of time.

During the predefined period of time after selection of a radial menu item during which the radial menu is displayed on the display screen, the user may be allowed to enter a predefined gesture to undo the selection in some embodiments of the invention. For example, in one embodiment, as the radial menu is fading away during the predefined time period, a predefined screen pointer event such as a mouse click, and/or a predefined stroke may undo the selection of the radial menu item.

Radial Menus with Variable Item Areas

As described above, radial menus allow greater accuracy and speed in comparison to traditional drop down menus while making menu selections. The accuracy of selection in a radial menu may depend on the number of pie slices included therein. A greater number of pie slices results in smaller sized pie slices and a higher density of radial menu items in the radial menu. As a result, the probability of making an erroneous selection using the gestures described above may increase. In one embodiment, the number of pie slices may be limited to between 6 and 8 because, within this range, the greatest speed and accuracy of selection may be achieved.

One skilled in the art will recognize that including a fewer number of pie slices in the radial menu result in each pie slice being relatively larger. Larger pie slices have a higher probability of accurate selection because a larger amount of area is available for making screen pointer gestures for selecting the radial menu items. Conversely, smaller pie slices have a lower probability of accurate selection because the area available for making screen pointer gestures is smaller. Therefore, it is easier to select radial menu items from larger pie slices in comparison to smaller pie slices. In the examples described hereinabove, the radial menus have been shown with a plurality of pie slices that have the same size. Therefore, each of the plurality of pie slices may have the same probability of accurate selection.

In some embodiments, it may be desirable to make it easier to select some radial menu items and more difficult to select other radial menu items. For example, it may be desirable to make it easier to select radial menu items associated with commonly used functions. In another example, it may be desirable to make radial menu items associated with destructive functions, for example, the delete function, more difficult to select. Making a radial menu item more difficult to select may require a user to make a more conscious and concerted effort to select the radial menu item. Therefore, the probability of accidental selection of the difficult to select radial menu item may be reduced.

Some embodiments of the invention may provide radial menus having variable sized pie slices in which the radial menu items may be placed. Therefore, it may be relatively easier to select radial menu items in larger pie slices in comparison to radial menu items in smaller pie slices. In one embodiment of the invention, each of a plurality of available radial menu items may have a selectability value associated therewith. The selectability value of a radial menu item may indicate the desired easiness of selection of the radial menu item. Any range of selectability values may be defined in one embodiment. For example, the selectability values may have a range of 1-10, wherein a selectability value of 1 indicates that the greatest difficulty of selection is desired, and a selectability value of 10 indicates that the least difficulty of selection is desired for the radial menu item. While numerical selectability values are described herein, in alternative embodiments, the selectability value may be of any other reasonable type. For example, in one embodiment, the selectability value may be a boolean value, e.g., easy or difficult.

In the following examples, the terms "higher selectability value" and "lower selectability value" are used in reference to the selectability values of radial menu items. For purposes of this specification, a higher selectability value is assumed to indicate lower difficulty in selecting an associated radial menu item, and a lower selectability value is assumed to indicate a greater difficulty in selecting an associated radial menu item. However, in alternative embodiments, the opposite may be true. I.e., a higher selectability value may indicate greater difficulty in selecting an associated radial menu item, and a lower selectability value indicates a lower difficulty in selecting an associated radial menu item.

The selectability values of the radial menu items may be defined in the user preferences 221 in one embodiment of the invention, and therefore, may be modified by a user. In alternative embodiments, the selectability value may be determined based on historic selection of the radial menu items 222. In such embodiments, the menu manager 215 may be configured to maintain the historic selection data for each of the radial menu items 222 and compute a selectability value for each item based on the historic selection data.

While determining selectability values based on historic selection data, probability of selection, the nature of a function associated with the radial menu item, and the like are disclosed herein, in alternative embodiments, any criteria may be used to determine the selectability value. Exemplary criteria may include, for example, the length of time associated with execution of a function associated with a radial menu item, a corresponding expense, reversibility of the function, safety of execution of the function, and the like.

Figure 11:
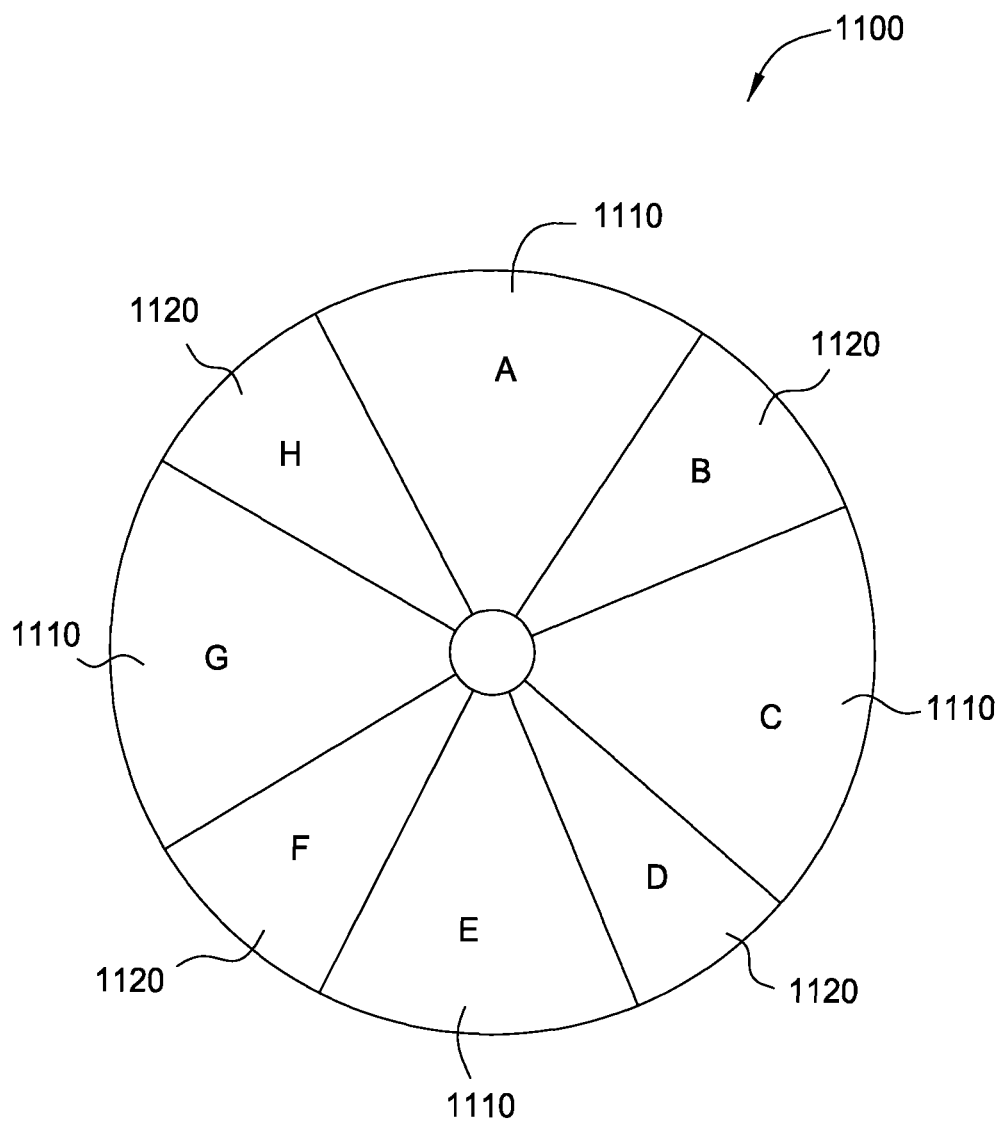
FIG. 11 illustrates a radial menu having variable selectable item areas, according to an embodiment of the invention.

In one embodiment of the invention, the menu manager 215 may be configured to display a radial menu having a predefined number of pie slices of each of a plurality of dimensions. FIG. 11 illustrates an exemplary radial menu 1100 comprising a first plurality of pie slices 1110 and a second plurality of pie slices 1120. As shown in FIG. 11, the first plurality of pie slices 1110 may be larger in area compared to the second plurality of pie slices 1120. While pie slices of two different sizes 1110 and 1120 are shown herein, in alternative embodiments, pie slices of any number of different dimensions may be displayed in the radial menu 1100.

In one embodiment, the first plurality of pie slices 1110 and the second plurality of pie slices 1120 may be arranged in an alternating manner, as illustrated in FIG. 11. The pie slices may be arranged in an alternating manner so that the variable sized pie slices are arranged substantially in the same orientation as same-sized pie slices. However, in other embodiments, any reasonable arrangement of the pie slices 1110 and 1120 may be possible. For example, in a particular embodiment, all the first pie slices 1110 may be placed adjacent to one another and all the second pie slices 1120 may be placed adjacent to one another.

In one embodiment of the invention, the menu manager 215 may be configured to place radial menu items having a relatively higher selectability value in larger pie slices and radial menu items having lower selectability values in the smaller pie slices. For example, radial menu items A, C, E, and G may have relatively higher selectability values than the radial menu items B, D, F, and H. Accordingly, radial menu items A, C, E, and G may be placed in the pie slices 1110 and the radial menu items place radial menu items B, D, F, and H may be placed in the pie slices 1120. By placing the radial menu items with a higher selectability value in the larger pie slices 1110, the menu manager 215 may allow a user a greater range of motion for performing gestures to select radial menu items in the pie slices 1110. In other words, it is easier to select the radial menu items in the pie slices 1110 in comparison to the radial menu items in the pie slices 1120.

As discussed above, radial menus may be displayed in a display screen when a predefined screen pointer event for displaying a radial menu is detected. As described above, the particular radial menu items displayed in the radial menu may depend on, for example, a location of the screen pointer on the screen, a screen object over which the predefined screen pointer occurs, or the like. Therefore, in one embodiment of the invention, the menu manager 215 may be configured to determine the particular radial menu items that are to be displayed in a radial menu 1100 upon receiving a predefined screen pointer event for displaying a radial menu. The menu manager 215 may then retrieve the selectability values associated with each of the determined radial menu items. Thereafter, the menu manager 215 may place the radial menu items in the pie slices 1110 and 1120 based on the retrieved selectability values of the radial menu items.

Figure 12:
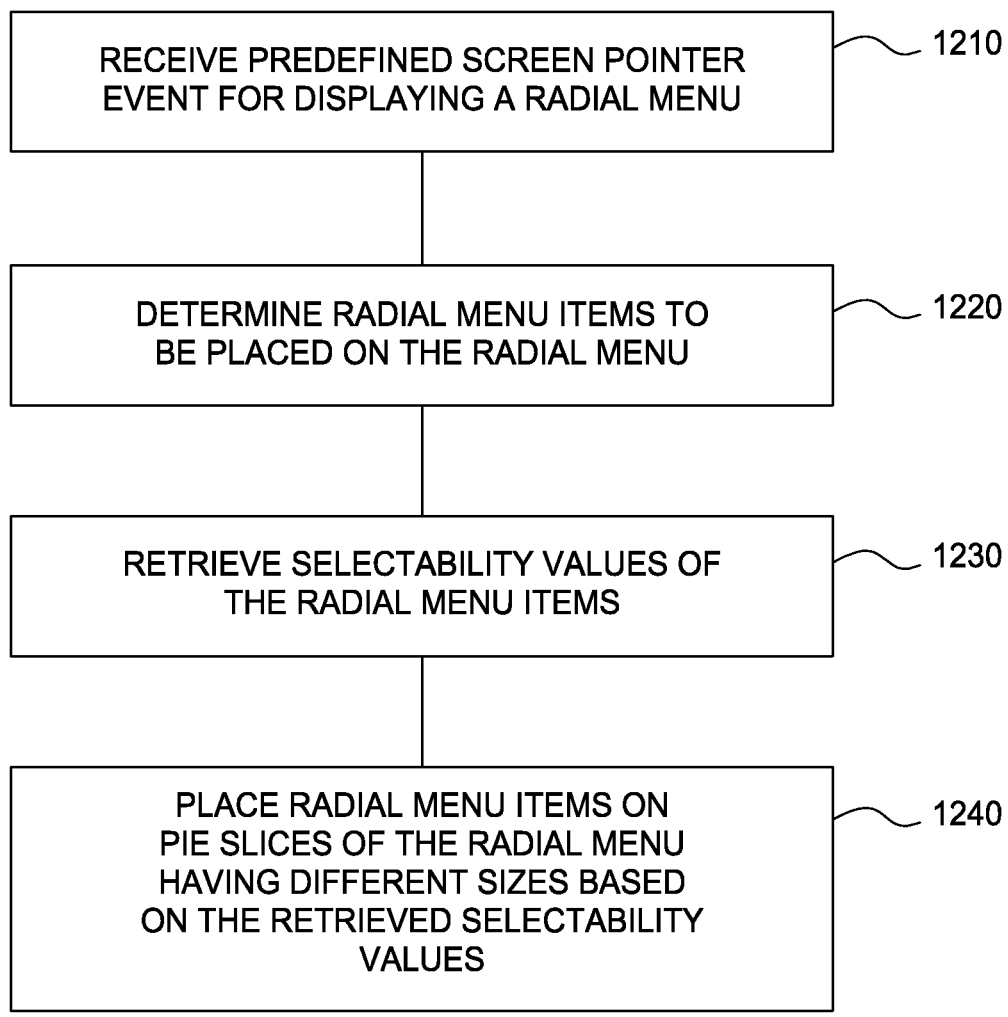
FIG. 12 is a flow diagram of exemplary operations performed to place radial menu items in a radial menu having variable selectable item areas, according to an embodiment of the invention.

FIG. 12 is a flow diagram of exemplary operations performed by the menu manager while placing radial menu items in a radial menu. The operations may begin in step 1210 by receiving a predefined screen pointer event for displaying a radial menu. In step 1220 the menu manager 215 may determine a plurality of radial menu items that will be displayed in the radial menu. The plurality of radial menu items may be determined based on, for example, on a location of the screen pointer in the display screen, a particular screen object over which the screen pointer event occurs, or the like.

In step 1230, the menu manager 215 may retrieve selectability values associated with each of the radial menu items. The menu manager may then place the radial menu items in pie slices of the radial menu having different sizes based on the selectability values of the radial menu items.

In one embodiment of the invention, each selectability value that may be assigned to a radial menu item may be associated with a particularly dimensioned pie slice of a set of different possible dimensions for the pie slices in a radial menu. For example, in one embodiment, the radial menu items of a radial menu may have one of three possible selectability values. As an example, the "delete" radial menu item may be associated with a first selectability value, the "save" radial menu item may be associated with a second selectability value, and the "print" radial menu item may be associated with a third selectability value.

Each of the selectability values may correspond to a different sized pie slice that may be placed in the radial menu. For example the first selectability value may be associated with a pie slice having first dimensions, the second selectability value may be associated with a pie slice having second dimensions, and the third selectability value may be associated with a pie slice having third dimensions. Accordingly, radial menu items having the first, second and third selectability values may only be placed in pie slices having corresponding dimensions.

For example, in one embodiment, a radial menu that is displayed on a display screen may include a plurality of each of pie slices having the first, second, and third dimensions. Accordingly, the "delete" radial menu item may only be placed in a pie slice having the first dimensions, the "save" radial menu item may only be placed in a pie slice having the second dimensions, and the "print" radial menu item may only be placed in a pie slice having the third dimensions.

In one embodiment of the invention, the menu manager 215 may be configured to dynamically determine the size of pie slices in the radial menu based on the relative selectability values of radial menu items to be displayed in the radial menu. In a particular embodiment, the size of each pie slice of the radial menu item may be determined by an angle created by two straight sides of the pie slice. In one embodiment, the angle of each pie slice may be determined based on the following formula.

$$\text{Pie Angle} = \frac{\text{selectability value of radial menu item}}{\text{sum of selectability values of all radial menu items}} \cdot 360 \text{ degrees}$$

As an example, assume that three radial menu items "delete", "save", and "print" are to be placed in the radial menu. Further assume that the "delete" radial menu item has a selectability value of 1, the "print" radial menu item has a selectability value of 2, and the "save" radial menu item has a selectability value of 3. Using the formula above, the angle for the pie slice in which the "delete" radial menu item will be placed may be (1/6)*360=60°. The angle for the pie slice in which the "print" radial menu item will be placed may be (2/6)*360=120°, and the angle for the pie slice in which the "save" radial menu item will be placed may be (3/6)*360=180°.

Figure 13:
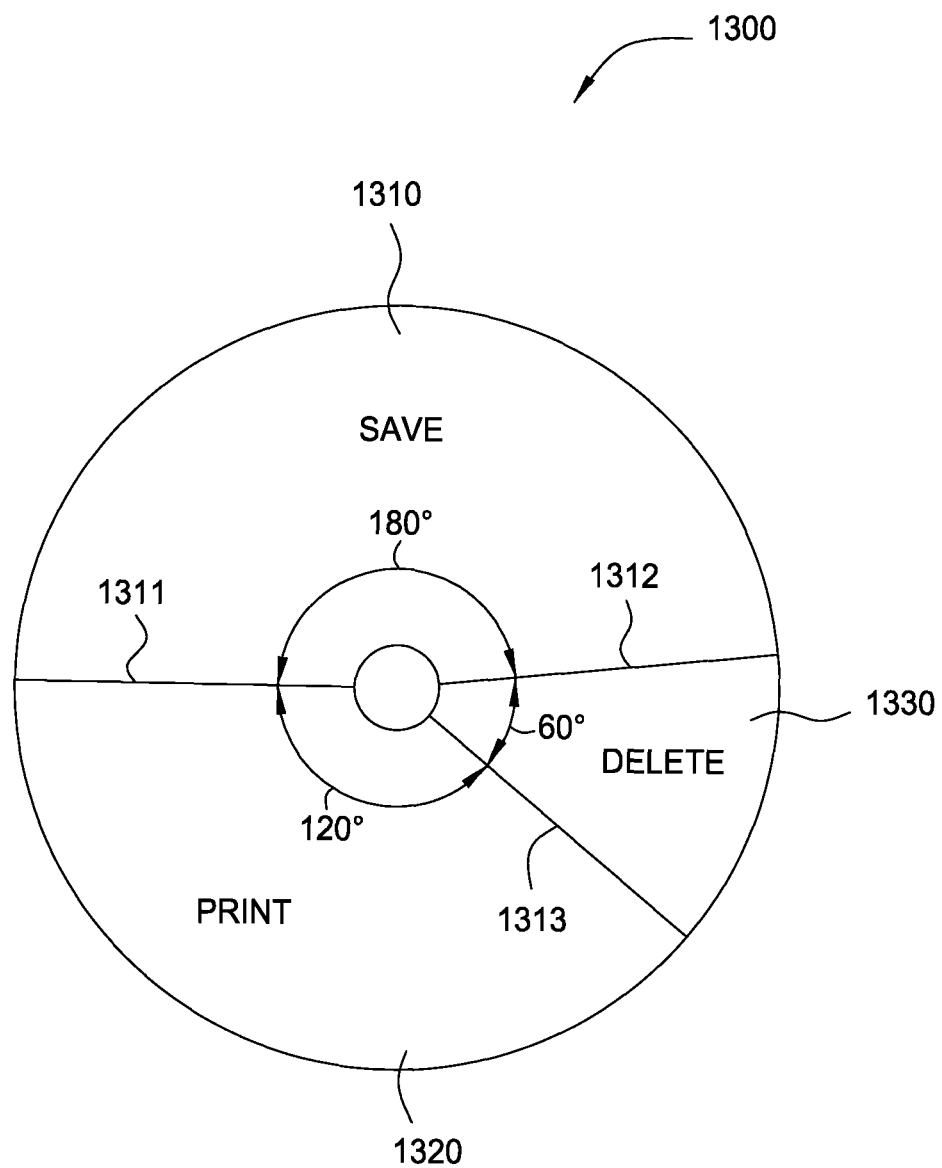
FIG. 13 illustrates another radial menu having variable selectable item areas, according to an embodiment of the invention.

FIG. 13 illustrates an exemplary radial menu 1300 comprising pie slices 1310, 1320, and 1330 that are dimensioned according to the above calculations. As illustrates, the pie slice 1310 includes the "save" radial menu item. Accordingly, pie slice 1310 is dimensioned with a 180° angle between the straight sides 1311 and 1312. The pie slice 1320 includes the "print" radial menu item. Accordingly, pie slice 1320 is dimensioned with a 120° angle between the straight sides 1311 and 1313. The pie slice 1330 includes the "delete" radial menu item. Accordingly, pie slice 1330 is dimensioned with a 60° angle between the straight sides 1312 and 1313.

Overlapping Radial Menu Pie Slices

Figure 14:
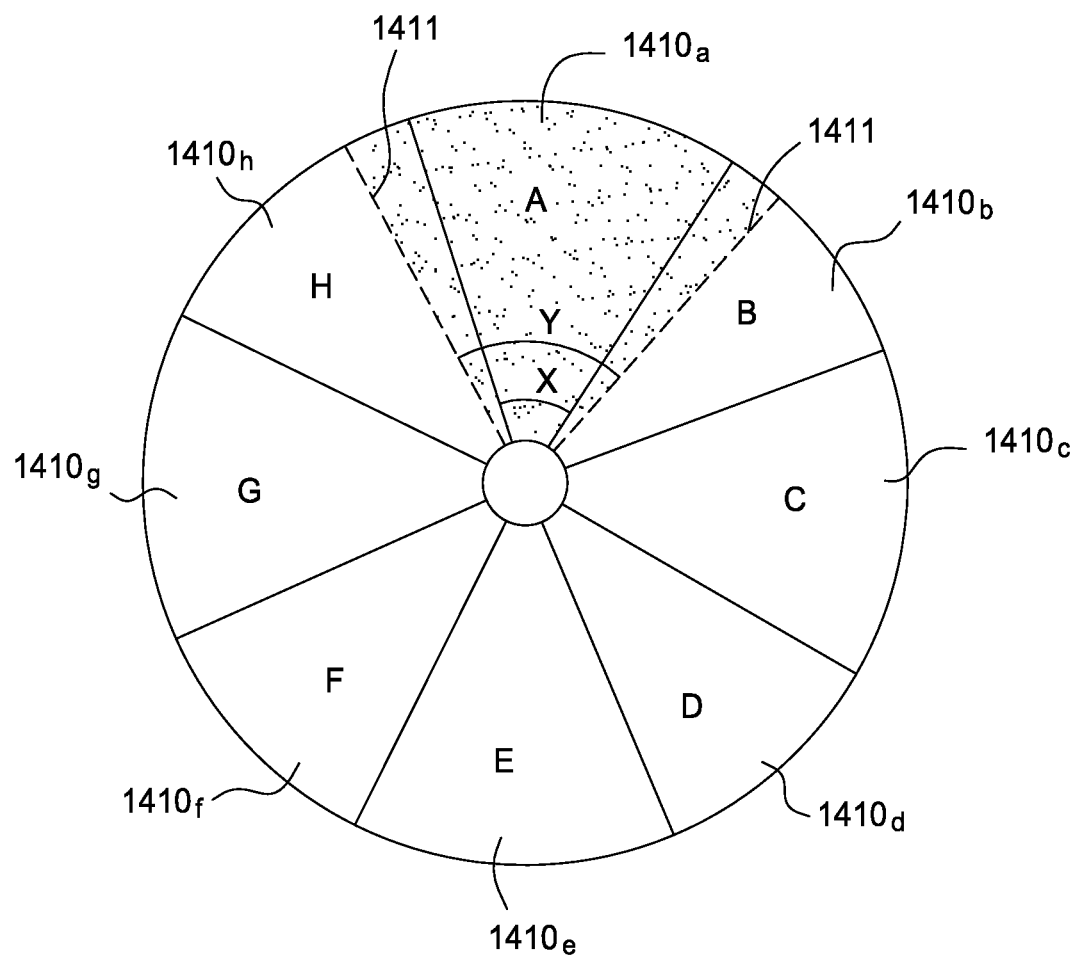
FIGS. 14-16 illustrate a radial menu having overlapping selectable item areas, according to an embodiment of the invention.

In one embodiment of the invention, different sized radial menu pie slices may be placed over each other in an overlapping manner in the radial menu. FIG. 14 illustrates an exemplary radial menu 1400 according to an embodiment of the invention. The radial menu 1400 may include a plurality of pie slices 1410a-h. In one embodiment of the invention, when the radial menu is initially displayed, each of the pie slices 1410a-h may have the same shape. For example, each of the pie slices 1410a-h may have an angle X between the lines dividing the pie slices in the radial menu, as illustrated in FIG. 14.

In alternative embodiments, each of the pie slices 1410 may be shown having different sizes. For example, the pie slices may be arranged, as shown in FIG. 11. Regardless of whether the pie slices are initially shown having the same size or different sizes, in one embodiment of the invention, each pie slice may have at least two possible sizes associated therewith. Specifically, each pie slice may have a non-activated size and an activated size. The pie slice may be shown with the non-activated size in the radial menu when a radial menu item in the pie slice is not activated by a screen pointer. On the other hand, the pie slice may be shown with the activated size when the radial menu item is activated by a screen pointer, as is described below.

For example, as shown in FIG. 14, the pie slice 1410a has a first size determined by the angle X. The first size may be a non-activated size because none of the radial menu items are shown as activated. In FIG. 14, the shaded area illustrates the non activated size of pie slice 1410a. FIG. 14 also illustrates dashed lines 1411 with an angle Y, therebetween, which illustrate an activated size for the pie slice 1410a.

Figure 15:
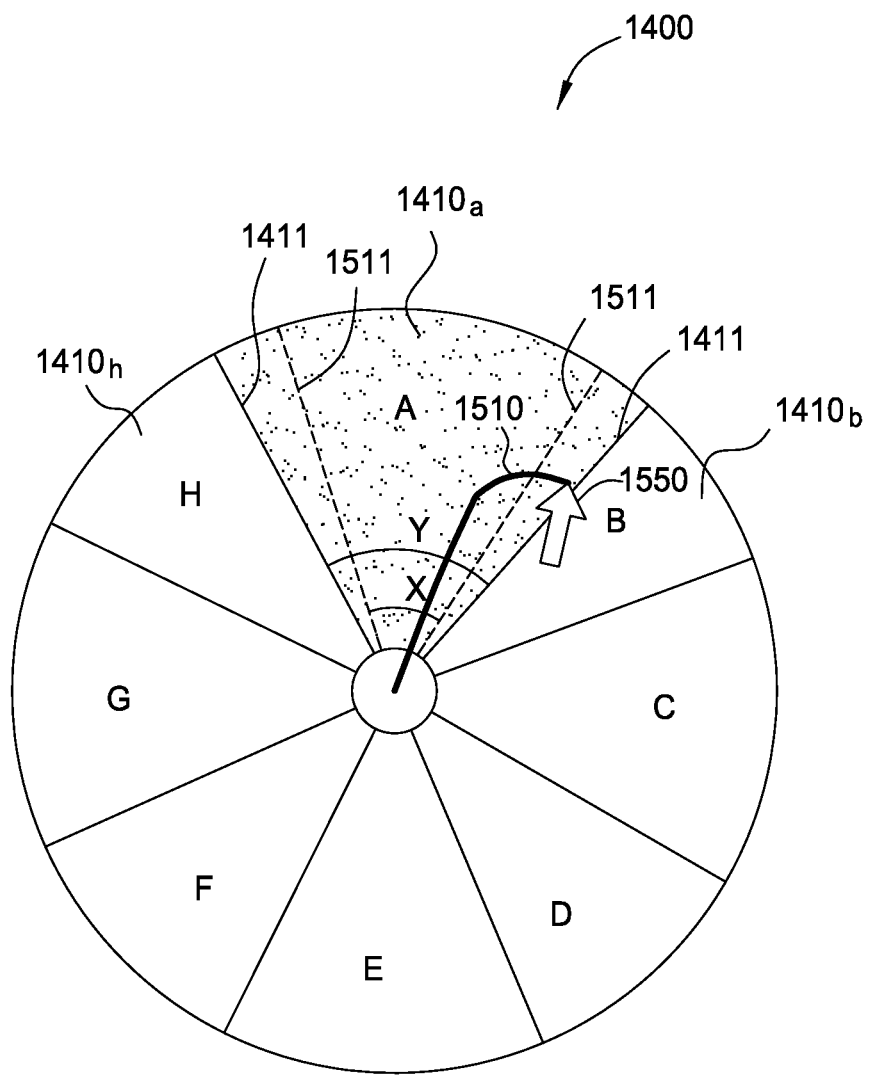

As described above, when a screen pointer is moved over a selection zone of a radial menu, for example, over the pie slice 1410a, the radial menu item may be activated. In one embodiment, when a radial menu item is activated, the size of the pie slice 1410 including the activated radial menu item may be changed to its respective activated size. For example, FIG. 15 illustrates a gesture 1510 that moves a screen pointer 1550 over the pie slice 1410a, thereby activating the radial menu item A. As a result of activating the radial menu item A, the size of pie slice 1410a is changed to its respective activated size. The shaded area in FIG. 15 illustrates the activated size of pie slice 1410a.

As illustrated in FIG. 15, after activation of radial menu item A, the lines 1411 and the angle Y define the pie slice 1410a. The angle X and the dashed lines 1511 illustrate the size of the pie slice 1410a prior to activation of the radial menu item A. Because the pie slice 1410a is bigger after activation, the selection area for performing gestures to select the radial menu item A also becomes greater, thereby making it easier to select the radial menu item A. In other words, the selection zone for the radial menu item A becomes greater upon activation, thereby making it easier to select the radial menu item A.

While a pie slice 1410a with an activated size greater than its non-activated size is disclosed herein, in alternative embodiments, the activated size of a pie slice may be smaller than its non-activated size. Whether the activated size is greater or smaller than the non-activated size may depend on a desired accuracy in selection of the radial menu item. For example, if a greater accuracy is desired (difficulty in selection), the activated size may be smaller than the non-activated size. On the other hand, if lower accuracy is desired, then the activated size may be greater than the non-activated size.

Displaying a radial menu pie in its respective activated size may result in a change in the size of one or more adjacent pie slices. For example, referring to FIG. 15, the activation of the pie slice 1410a results in the sizes of pie slices 1410b and 1410h to become smaller because the pie slice 1410 a overlaps the pie slices 1410b and 1410h. Of course, if the activated size of pie slice 1410a is smaller than its respective non-activated size, the size of pie slices 1410b and 1410h would become larger upon the activation of the pie slice 1410a. Changing the size of the adjacent pie slices may result in a corresponding change in the selection zone of the slices.

In one embodiment of the invention, the activated and non-activated size of a pie slice may depend on a selectability value of a radial menu item included therein. For example, if a radial menu item with a high selectability value is placed in a pie slice, the activated size of the pie slice may be greater than the non-activated size. Conversely, if a radial menu item with a low selectability value is placed in a pie slice, the activated size of the pie slice may be smaller than the non-activated size. In one embodiment, the selectability value of a radial menu may be used to determine the exact activated size of a pie slice. For example, the selectability value may determine the angle between lines separating the pie slices, as described by the equation provided in the previous section.

In one embodiment of the invention, a pie slice of a radial menu item may remain in the activated size until a screen pointer moves out of the selection zone as defined by the activated pie slice. For example, in FIG. 15, so long as the screen pointer remains within the shaded selection zone between the lines 1411, the radial menu item A may remain activated. For example, the gesture 1510 moves the screen pointer 1510 outside of the bounds of the lines 1511 (but within the lines 1411), however, the radial menu item A remains active. Therefore, in some embodiments, the entire shaded region between the lines 1411 in FIG. 15 may be available to perform a predefined gesture for selecting a radial menu item to select the radial menu item A.

Figure 16:
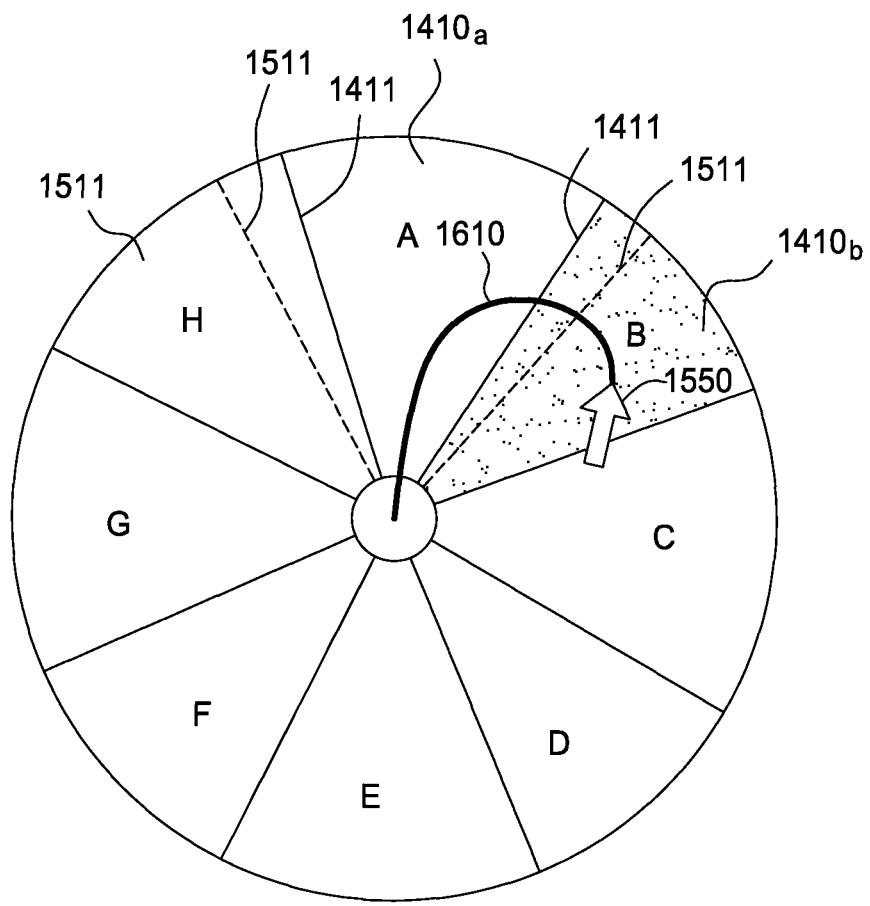

In one embodiment, when the screen pointer moves out of the bounds of an activated pie slice, the size of the pie slice may be changed back to its respective non activated pie size. FIG. 16 illustrates a gesture 1610 that moves the screen pointer 1550 out of the bounds of an activated pie slice 1410a into a selection zone of a pie slice 1410b, thereby activating the pie slice 1410b and reverting the pie slice 1410a from its activated size to a non-activated size. In FIG. 16, the lines 1511 demarcate the activated size of the pie slice 1410a. After the pointer 1550 moves outside the bounds of a line 1511, the size of the pie slice 1410 is changed back to its non-activated state as defined by the lines 1411.

In one embodiment of the invention, activation of the pie slice 1410b may result in the pie slice 1410b being shown in a respective activated size. Because the activated size of the pie slice 1410b may be larger (or smaller) than its non-activated size, the pie slice 1410b may overlap portions of the pie slice 1410a. Therefore, when the pointer 1550 activates the pie slice 1410b, the size of pie slice 1410a may be changed to a size other than its non-activated size in some embodiments.

By providing a radial menu with variable sized pie slices, embodiments of the invention facilitate fast and efficient selection of menu items in comparison to traditional radial menus.

While the foregoing is directed to embodiments of the present invention, other and further embodiments of the invention may be devised without departing from the basic scope thereof, and the scope thereof is determined by the claims that follow.

What is claimed is:

1. A computer implemented method for displaying a radial menu, comprising configuring one or more processors to perform an operation comprising:
    displaying, on a screen of an output device, the radial menu comprising a plurality of pie slices, each pie slice defining a selection zone for a respective radial menu item, wherein a first pie slice of the plurality of pie slices has a first predefined size;
    receiving a first gesture that moves a screen pointer over the first pie slice on the screen, thereby activating the first pie slice of the radial menu; and
    in response to the activation of the first pie slice, executing a menu manager on one or more of the processors to temporarily change a size of the first pie slice from the first predefined size to a second predefined size while the first pie slice is activated,
    wherein the second predefined size is smaller than the first predefined size and is based on a selectability value for a destructive function associated with the first pie slice,
    wherein changing the size of the first pie slice comprises, while the first pie slice is activated by the first gesture that moves the screen pointer over the first pie slice on the screen, decreasing an angle between lines bounding the first pie slice while maintaining a radial length of the first pie slice, and
    wherein, if the first pie slice is deactivated after being activated, the size of the first pie slice is returned to the first predefined size by increasing the angle between the lines bounding the first pie slice while the radial length of the first pie slice is maintained.

2. The method of claim 1, wherein changing the size of the first pie slice from the first predefined size to the second predefined size comprises overlapping the activated first pie slice with at least a portion of one or more pie slices adjacent to the first pie slice.

3. The method of claim 2, further comprising:
    receiving at least a portion of a predefined second gesture in the portion of the pie slices adjacent to the first pie slice that overlap the activated first pie slice; and
    activating a radial menu item corresponding to one of the overlapping pie slices in response to receiving the gesture.

4. The method of claim 1, further comprising:
    receiving a third gesture that moves the screen pointer outside a bounds of the activated first pie slice having the second predefined size,
    wherein the first pie slice is deactivated in response to the third gesture.

5. A non-transitory computer readable storage medium comprising a program product which, when executed, is configured to perform an operation for displaying a radial menu, the operation comprising:
    display, on a screen of an output device, the radial menu comprising a plurality of pie slices, each pie slice defining a selection zone for a respective radial menu item, wherein a first pie slice of the plurality of pie slices has a first predefined size;

receiving a first gesture that moves a screen pointer over the first pie slice on the screen, thereby activating the first pie slice of the radial menu; and in response to the activation of the first pie slice, temporarily changing a size of the first pie slice from the first predefined size to a second predefined size while the first pie slice is activated, wherein the second predefined size is smaller than the first predefined size and is based on a selectability value for a destructive function associated with the first pie slice, wherein changing the size of the first pie slice comprises, while the first pie slice is activated by the first gesture that moves the screen pointer over the first pie slice on the screen, decreasing an angle between lines bounding the first pie slice while maintaining a radial length of the first pie slice, and wherein, if the first pie slice is deactivated after being activated, the size of the first pie slice is returned to the first predefined size by increasing the angle between the lines bounding the first pie slice while the radial length of the first pie slice is maintained.

6. The computer readable storage medium of claim 5, wherein changing the size of the first pie slice from the first predefined size to the second predefined size comprises overlapping the activated first pie slice with at least a portion of one or more pie slices adjacent to the first pie slice.

7. The computer readable storage medium of claim 6, wherein the operation further comprises:

receiving at least a portion of a predefined second gesture in the portion of the pie slices adjacent to the first pie slice that overlap the activated first pie slice; and activating a radial menu item corresponding to one of the overlapping pie slices in response to receiving the gesture.

8. The computer readable storage medium of claim 5, wherein the operation further comprises:

receiving a third gesture that moves the screen pointer outside a bounds of the activated first pie slice having the second predefined size, wherein the first pie slice is deactivated in response to the third gesture.

9. A system, comprising:

a memory comprising a program; and a processor which, when executing the program, is configured to:

display, on a screen of an output device, a radial menu comprising a plurality of pie slices, each pie slice defining a selection zone for a respective radial menu item, wherein a first pie slice of the plurality of pie slices has a first predefined size, receive a first gesture that moves a screen pointer over the first pie slice on the screen, thereby activating the first pie slice of the radial menu, and in response to the activation of the first pie slice, temporarily change a size of the first pie slice from the first predefined size to a second predefined size while the first pie slice is activated, wherein the second predefined size is smaller than the first predefined size and is based on a selectability value for a destructive function associated with the first pie slice, wherein changing the size of the first pie slice comprises, while the first pie slice is activated by the first gesture that moves the screen pointer over the first pie slice on the screen, decreasing an angle between lines bounding the first pie slice while maintaining a radial length of the first pie slice, and wherein, if the first pie slice is deactivated after being activated, the size of the first pie slice is returned to the first predefined size by increasing the angle between the lines bounding the first pie slice while the radial length of the first pie slice is maintained.

10. The system of claim 9, wherein changing the size of the first pie slice from the first predefined size to the second predefined size comprises overlapping the activated first pie slice with at least a portion of one or more pie slices adjacent to the first pie slice.

11. The system of claim 10, wherein the processor is further configured to:

receive at least a portion of a predefined second gesture in the portion of the pie slices adjacent to the first pie slice that overlap the activated first pie slice; and activate a radial menu item corresponding to one of the overlapping pie slices in response to receiving the gesture.

12. The system of claim 9, wherein the processor is further configured to:

receive a third gesture that moves the screen pointer outside a bounds of the activated first pie slice having the second predefined size, wherein the first pie slice is deactivated in response to the third gesture.

13. A computer implemented method for displaying a radial menu, comprising: configuring one or more processors to perform an operation, comprising:

receiving a predefined screen pointer event for displaying a radial menu on a screen of an output device;

in response to receiving the predefined screen pointer event, determining a plurality of radial menu items to be displayed in the radial menu, wherein each of the plurality of radial menu items has an associated weight value, each of the weight values has an associated pie slice size, and each of the weight values is determined based on at least one of a corresponding expense, reversibility of a function associated with the associated radial menu item, and whether the function associated with the associated radial menu item is a destructive function;

displaying, on the screen, the plurality of radial menu items in corresponding pie slices of the radial menu, wherein a size of each of the pie slices is determined based on the weight value of a corresponding radial menu item; and in response to activation of a first pie slice by a gesture that moves the screen pointer over the first pie slice on the screen, temporarily changing a size of the first pie slice from a first size to a second size while the first pie slice is activated, wherein the second size is smaller than the first size and is based on a first weight value for a destructive function associated with one of the radial menu items displayed in the first pie slice, wherein changing the size of the first pie slice comprises, while the first pie slice is activated by the gesture that moves the screen pointer over the first pie slice on the screen, decreasing an angle between lines bounding the first pie slice while maintaining a radial length of the first pie slice, and wherein, if the first pie slice is deactivated after being activated, the size of the first pie slice is returned to the first size by increasing the angle between the lines bounding the first pie slice while the radial length of the first pie slice is maintained.

14. The method of claim 13, wherein radial menu items having a relatively greater weight value are displayed in relatively larger pie slices.

15. The method of claim 1, wherein:
   changing the size of the first pie slice to the second predefined size reduces a probability of accidental selection of the first pie slice.

* * * * *